United States Patent
Mizutani et al.

[11] Patent Number: 5,946,348
[45] Date of Patent: Aug. 31, 1999

[54] MODULATOR AND DEMODULATOR (MODEM)

[75] Inventors: Mikio Mizutani, Tokyo; Nobuhiko Noma; Eizo Katayama, both of Yokohama; Genzo Takagi, Urawa; Yoshihiko Noguchi; Mitsuhiro Araki, both of Kawasaki, all of Japan

[73] Assignee: Matsushita Graphic Communication Systems, Inc., Tokyo, Japan

[21] Appl. No.: 08/664,953

[22] Filed: Jun. 13, 1996

[30] Foreign Application Priority Data

Jun. 14, 1995 [JP] Japan .................................. 7-147235
Jan. 11, 1996 [JP] Japan .................................. 8-002853

[51] Int. Cl.[6] .................................................. H04B 1/38
[52] U.S. Cl. .................................................. 375/222
[58] Field of Search .................................. 375/220, 222, 375/219, 257, 259, 377

[56] References Cited

U.S. PATENT DOCUMENTS

| | | | |
|---|---|---|---|
| 5,054,020 | 10/1991 | Meagher | 375/370 X |
| 5,268,928 | 12/1993 | Herh et al. | 375/222 |
| 5,359,709 | 10/1994 | Blanc et al. | 375/222 |
| 5,384,822 | 1/1995 | Brown et al. | 379/10 |
| 5,450,530 | 9/1995 | Snyder et al. | 375/220 |
| 5,657,345 | 8/1997 | Lazaridis | 375/222 |
| 5,711,012 | 1/1998 | Bottoms et al. | 379/93.09 |

Primary Examiner—Young T. Tse
Attorney, Agent, or Firm—Ratner & Prestia

[57] ABSTRACT

A MODEM can shorten the processing time of an interface disposed between a data terminal equipment (DTE) and the MODEM. The MODEM stores an object program of a procedure in a memory and switches an operational mode of the MODEM automatically corresponding to the prescribed procedure thereby executing the procedure corresponding to the current operational mode. The MODEM further comprises a timer which monitors the transits time between a completed procedure and the next procedure, and the MODEM starts the process of a specified operational mode based on a mode-setting-instruction of the procedure as well as monitoring the transitions time by using the timer, and executing a next specified operational mode when the timer times out, thereby allowing the MODEM to perform the various operational mode switches.

24 Claims, 18 Drawing Sheets

Channel Area

| Channel Command |
|---|
| Channel Status |
| Bank 0 Top Address |
| Bank 0 End Address |
| Bank 1 Top Address |
| Bank 1 End Address |
| Bank 2 Top Address |
| Bank 2 End Address |
| Bank 3 Top Address |
| Bank 3 End Address |

Channel Command

→ Channel mode

0: receiving mode

1: transmitting mode

MODULATOR AND DEMODULATOR (MODEM)

BACKGROUND OF THE INVENTION

The present invention relates to a MODEM for use with Data Terminal Equipment (DTE) such as a computer or a facsimile apparatus for data communication via a telephone line. Specifically, the invention relates to a MODEM which selects an appropriate modulating method from a plurality of modulating methods.

Description of the Prior Art

Several kinds of modulation methods are available in MODEMs. For example, frequency modulation, four-phase differential phase shift modulation, quadrature amplitude modulation, and phase amplitude modulation are available. Selection of these methods may depend, for example, on the speed of communication. Recently, many MODEMs, for example a MODEM incorporated in a facsimile apparatus, switch the modulation/demodulation mode as well as communication speed depending on the protocol. It is desirable to synchronize the timing of a mode switch between a transmitter and a receiver. Conventionally, DTE, the host apparatus of a MODEM, selects an operational mode. The MODEM follows an instruction from the DTE to switch to the appropriate operational mode.

The DTE is connected to the MODEM via a BUS. The CPU contained within the DTE distinguishes between transmitted/received data by reading/writing to the transmitting-data-register and receiving-data-register which are both housed in the MODEM. In addition, the CPU recognizes the present operational mode of the MODEM by reading the status-register, and switches the operational mode of the MODEM by writing a mode number into the mode register. The modulating and demodulating portion of the MODEM follows an instruction from the mode register, and reports the status of each operation to the DTE via the status-register.

Before the ITU (International Telecommunication Union) announced the V.34 Standard based on the ITU-T Recommendation, many MODEMs used in facsimile machines were of the half-duplex type, and timing was not available for transmitting a waveform simultaneously from the transmitter and receiver. Therefore, either the transmitter or the receiver transmitted a waveform. The sequence of signal-transmission was determined by a protocol such as the T.30 Standard.

An operation according to the T.30 Standard is explained below:

If the previous mode is the receive mode, and the content of the received data is determined to require the next mode to be the transmitting mode, the DTE decodes the received data and instructs the MODEM to switch the mode. Software processing in the DTE requires time, however, and produces a signal gap between the end of the receiving signal and the start of the subsequent transmission. In half duplex communication the signal gap length will not cause a disruption in communication.

On the other hand, when the communication is based on the full duplex mode of the V.34 Standard, signals are transmitted simultaneously from both sides by communicating through a control channel. Accordingly, when the previous mode was the full-duplex mode of the control channel, and the next mode is to be the receiving mode of a main channel, the DTE determines the control channel data and gives a mode switching command to the MODEM. A problem occurs in the above case: The timing of the mode switch depends on an instruction from the DTE. If processing the transmitted/received data by the DTE takes time, the MODEM cannot receive the main channel, because of a delay in switching from receiving of control channel data of the previous mode to receiving of main channel data of the following mode. When a high speed MODEM is employed, processing data volume increases, whereby these types of problems frequently occur.

When a V.34 Standard half-duplex MODEM is used, the main channel of one-way communication and the control channel of two way simultaneous communication are alternately switched. In this case, if a signal gap is greater than a specific period (0.1 seconds), an echo-suppresser is recovered, whereby the control channel cannot complete the two-way simultaneous communication, and the communication is unable to recover. In order to prevent this problem, the V.34 Standard specifies the signal gap to be within 70 ms±5 ms.

Therefore, a mechanism which shortens the processing time is required in an interface between the MODEM and the DTE. However, if the processing time can be shortened at the DTE side and switch timing can be accomplished in a shorter period in proportion to the signal gap length, monitoring the signal gap length desirably requires approximately ±5 ms accuracy. At the DTE side, software for monitoring the MODEM status thus desirably requires top priority, whereby the system design of the DTE becomes difficult.

SUMMARY OF THE INVENTION

The present invention overcomes the problems of the conventional methods, and shortens the processing time of the interface between the DTE and MODEM as well as switching operational modes independent of the DTE's software.

According to the present invention, an object program containing the control procedure is stored in a memory means. Corresponding to the object program execution, an operational mode is switched automatically in accordance with each procedure specified in advance. The procedure corresponding to the present operational mode being switched from the previous mode is automatically executed. In other words, the MODEM monitors the mode-switch-control and executes mode switching independent of the host apparatus DTE.

The basic structure of the present invention realizes this feature. Because the MODEM switches operational modes by itself, the DTE transfer efficiency is increased and a given timing is guaranteed, whereby data communications which desirably requires delicate timing can be satisfied, trouble-free communication is secured, and total communication efficiency is increased.

The present invention has various embodiments for this basic structure. First, data storage areas which temporarily store the data transmitted to/from the host apparatus are provided in each operational mode. Accordingly, when the MODEM switches modes, received data is written into different areas in response to each mode. If a response speed cannot match the MODEM's communication speed, the received data of the next mode is stored in another area of the memory means. Therefore, the received data of the next mode will not overwrite the received data of the previous frame.

In another embodiment, a data storage area comprises a pair of areas corresponding to each operation. One area is a command storage area for storing commands from the data terminal equipment (DTE). The second area is a data storage area for storing data from the DTE. When data in a storage area is processed, the command written by the host apparatus into the corresponding command storage area is checked, and an operation follows the command.

In a further embodiment, the data storage areas of each operational mode have several banks. The data from the DTE is stored in each bank in a unit called a frame. An error-check is conducted on the stored data from the DTE. If a data error is detected, a "data error" is written into a status register, and the received data which includes the data error is canceled. In this embodiment, the data-error is not written in the corresponding bank, and the memory capacity is utilized with greater efficiency. Since the result of the error-check, i.e. data-error, is still maintained, notice can be given to the DTE that a data-error has occurred.

In another embodiment, the transition time between the end of a procedure and the start of the next procedure is monitored and a specified operational mode is automatically started when the transition time exceeds a prescribed period. In this embodiment, the response-delay to the next mode is prevented where a procedure requires ±5 ms accuracy for monitoring the signal gap length.

In a different embodiment, a received data frame in the MODEM is disassembled and analyzed to determine whether the data frame is an return to control for partial page (RCP) frame. If the data frame is an RCP frame, the operational mode is automatically switched from the main-channel-receiving-mode to the control channel mode, thereby preventing the missing of a control-channel-signal arriving within 75 ms after completing the main channel.

In a separate embodiment, the MODEM analyzes the received data. If the analysis determines that there is an end signal in the control channel of a pattern which does not occur in a data transmission, the MODEM automatically switches the operational mode from the control channel mode to the main-channel-receiving mode, thereby preventing the missing of a main channel signal arriving within 75 ms after completing the control channel.

Further, in another separate embodiment, the MODEM calculates an error quantity, and specifies the acceptable maximum error quantity. When the error quantity exceeds this acceptable maximum error quantity, a retraining signal is sent to the communication line. The acceptable maximum error quantity may be controlled by the DTE. Therefore, in this embodiment, when the quality of received data is lower during data transmission, the load on the DTE is reduced and also the quality level can quickly be recovered, whereby the entire communication can end quickly.

Finally, in a separate embodiment a timer is installed. The timer starts counting a prescribed time simultaneously when the MODEM transmits a specified signal to the communication line. When a response signal to the specified signal is detected before the timer reaches the specified time, the timer is reset. Otherwise, the DTE is informed of an abnormal transmission. In a normal operation where the response signal is detected from the line, the DTE does not respond to the detection of the response signal, thereby the DTE processing is never interrupted. Therefore, the load upon the DTE is reduced when compared to the situation where the DTE is required to handle transmission line control.

DETAILED DESCRIPTION

Figure 1:
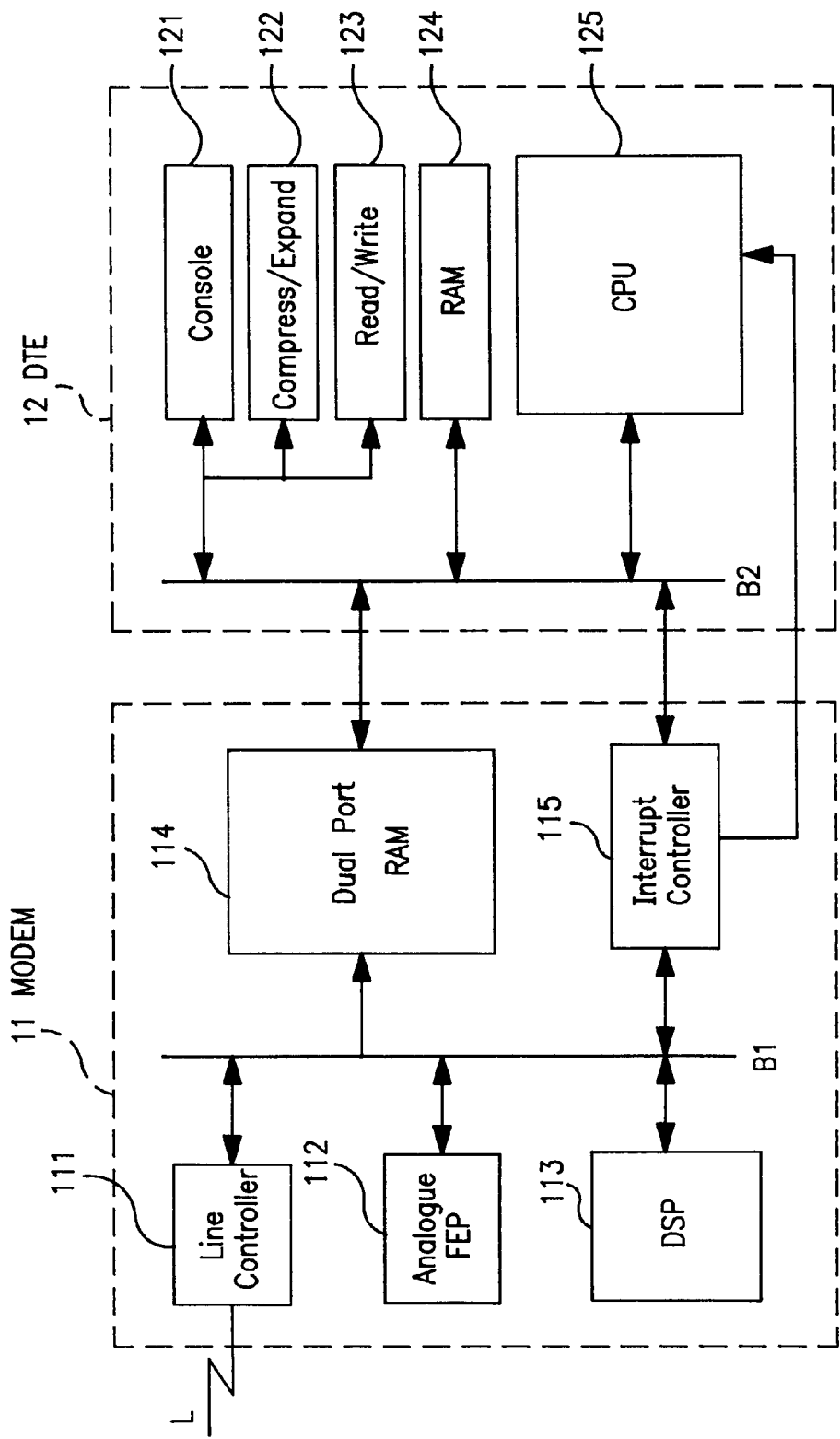
FIG. 1 is a block diagram depicting a MODEM according to an exemplary embodiment of the present invention.

FIG. 1 is a block diagram outlining a MODEM used in accordance with an exemplary embodiment of the present invention. A MODEM 11 modulates and demodulates data.

A facsimile controller 12 functions as a host DTE and processes data expansion and data recording. The MODEM 11 comprises a line controller 111, an analog front end processor 112 (FEP), a digital signal processor 113 (DSP which digitally processes modulation and demodulation etc., a dual port random access memory 114 (RAM) having two READ/WRITE access ports, and an interrupt controller 115.

The facsimile controller 12 comprises an image reader/recorder 123, an image data compressor/expander 122, a console 121 including a control panel, a working RAM 124 which temporarily stores image data, and a central processing unit 125 (CPU) which controls operation of the entire apparatus.

A first access port of the dual port RAM 114 is connected to a BUS B1 in the MODEM 11, and a second access port is connected to a BUS B2 in the facsimile controller 12, so that READ/WRITE from the MODEM 11 and facsimile controller 12 can occur simultaneously.

In an exemplary embodiment of the present invention a dual port RAM 114, is disposed between the DTE and MODEM, in order to increase data transmission efficiency between the DTE and MODEM as well as reducing the time-load on the DTE software. The dual port RAM 114 can transmit data in a data-frame unit. The data-frame unit is an error detecting unit. The buffer area of the frame unit is not limited to one frame but extends to a block area linking several frames (hereinafter called as a channel block.)

Figure 2:
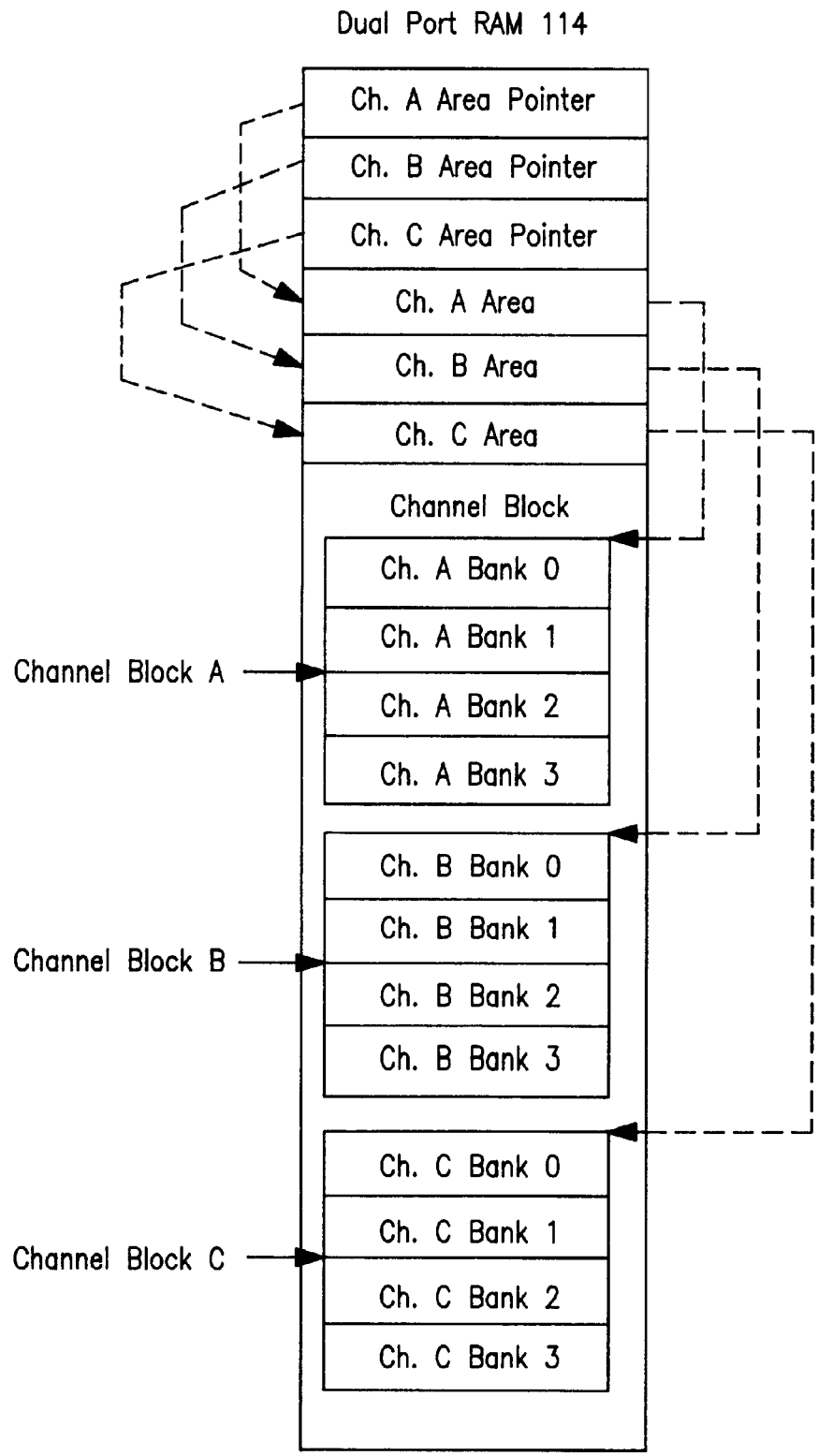
FIG. 2 depicts a memory structure of a dual port RAM of FIG. 1.

FIG. 2 depicts a memory structure of the dual port RAM 114 shown in FIG. 1. A communication buffer is independently provided for each mode, such as a channel block A for the main channel, a channel block B for the transmitter control channel, a channel block C for the receiver control channel. Each communication buffer has banks 0–3. The channel blocks A, B, and C have channel area pointers (CH area pointer) and channel areas (CH area). The CH area pointers have information for accessing the CH area.

Figures 3, 4:
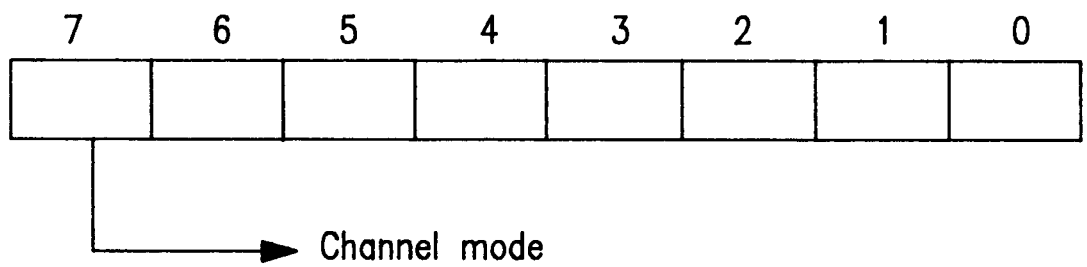
FIG. 3 depicts a memory structure of a channel area used to access a channel block of an exemplary embodiment of the present invention.
FIG. 4 details a bit map in the channel command illustrated in FIG. 3.

FIG. 3 depicts a memory structure required for accessing the channel blocks. A channel command is an area for storing a command. The command switches a corresponding channel to the transmit mode or the receive mode. A channel status is an area for displaying the information about an error in transmitting/receiving the corresponding channel.

FIG. 4 details an example of a bit map in the channel command shown in FIG. 3.

Figure 5:
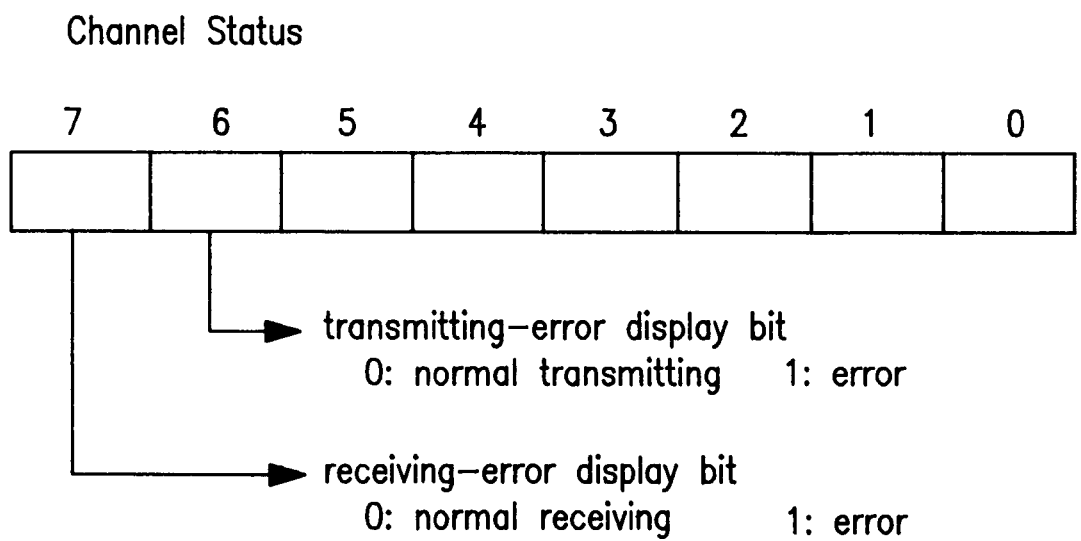
FIG. 5 details a bit map in the channel status illustrated in FIG. 4.

FIG. 5 details an example of a bit map in the channel status shown in FIG. 3.

The MODEM 11, structured as above, is explained here when the V.34 half duplex standard is used in for communication.

This embodiment shows how to control data received from the facsimile controller 12 independent of the operational mode.

When communicating using the V.34 half duplex standard a communication channel comprises a main channel and a control channel. The main channel is used for image information in the facsimile communication. The control channel is used for the communication of Phase B control information recommended in the T.30 Standard of the ITU-T. The main channel uses channel block A. Channel block B is used for transmitting the control channel, and channel block C is used for receiving the control channel.

First, the transmission-process of the control channel is described. In phase B of the T.30 Standard, the MODEM 11 sets the channel mode (bit 7) of channel block B to a "1", in order to transmit the control channel. Data is written into the bank 0 of channel block B. The MODEM 11 recognizes the Data Full/Empty display bit is a "1", confirms the completion of WRITE, reads the data from Bank 0, processes signals including modulation, and transmits data to the communication line. After transmitting data from Bank 0, the MODEM 11 changes the Data Full/Empty display bit of Status 0 to "0".

When the Data Full/Empty display bit of Status 1 (which corresponds to Bank 1) is "0", the facsimile controller 12 writes the next data-frame into Bank 1 while the MODEM 11 transmits the Bank 0 data. After completing WRITE, the Data Full/Empty display bit of Status 1 is changed to "1". The MODEM 11 checks Status 1 after completing the transmission of Bank 0. When the Data Full/Empty display bit is "1" (in other words, the next data-frame was already written), the Bank 1 data is transmitted the same way as the Bank 0 data was transmitted. Similarly, Banks 2, 3, and 0 are transmitted in this sequence in the data-frame unit. Although the transmit command of the control channel is being executed, when the Data Full/Empty display bits of the Bank status in all Banks are "0" and there is no data-frame available for transmission, the MODEM changes the transmitting-error-display-bit of channel status B to "1" and information to the facsimile controller 12 of a transmission error in channel block B.

Next, the receiving process of the control channel is described. The MODEM 11 sets the channel mode of channel command C to "0" in order to receive the control channel. The MODEM 11 receives and demodulates data, confirms that the Data Full/Empty display bit of Status 0 (which corresponds to Bank 0 of channel block C) is "0", and writes one data frame into Bank 0. After the writing is completed, the Data Full/Empty display bit of Status 0 is changed to "1" (Completing WRITE=READ Ready.) The facsimile controller 12 confirms that the Data Full/Empty display bit of Status 0 is "1", and reads data from Bank 0. When the Data Full/Empty display bit of Bank 1 is "0", the MODEM 11 writes the next received data-frame into Bank 1 while the data of Bank 0 is being read by the facsimile controller 12. Bank 2, 3, and 0, in this sequence, are received and processed in data-frame units.

Although the receiving command of the control channel is being executed, when the Data Full/Empty display bits of the Bank status for all Banks are 1" and received data-frames cannot be written into the vacant banks of C channel block, the MODEM 11 changes the receiving error display bit of channel status C to "1", and informs facsimile controller 12 of a receive error of channel block C.

As described above, transmitting/receiving of the control channel is processed by using channel blocks B and C. Therefore, even if the receiving/transmitting of the control channel is operated in a full-duplex-simultaneous-mode under the V.34 half duplex Standard, the MODEM and facsimile controller do not require complicated processes, but can deliver the transmitted/received data of the control channel securely and efficiently. The transmitting/receiving of the main channel is identical to that of the control channel. Namely, setting the channel-set-mode-bit of the channel command in channel block A to "1" switches to the transmit mode, and setting the channel-set-mode-bit of channel block A at "0" switches to the receive mode. The transmitting/receiving operation of the main channel can therefore be implemented.

Further in the V.34 half duplex Standard, a mode switch such as between the transmit/receive operation of the control channel to the transmitting or receive operation of the main channel, or vice versa can be executed.

Figure 6:
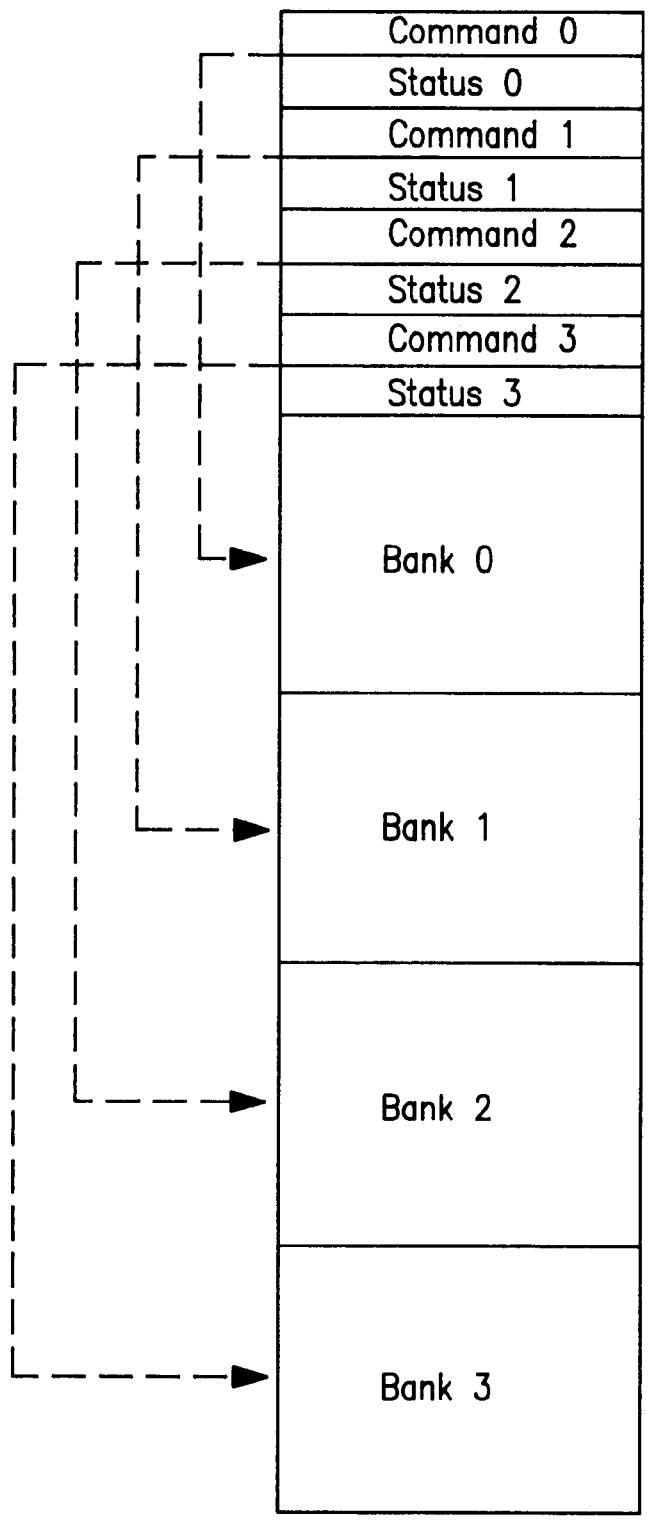
FIG. 6 depicts a relation between command areas, status areas and banks on the dual port RAM.

Third, the process of stopping the transmission of data is explained by referring to FIGS. 6–10. FIG. 6 depicts the relationship between the command areas, status areas and banks on the dual port RAM 114. The command areas store instructions about operations sent from the DTE such as channel ending, etc. The status areas store the information about the communication buffer's status such as Data Full/Empty display, aborts, and errors. These areas are provided to each bank in order to strictly control the completion of the processes when each bank completes a data transmission. Each bank stores data in the data-frame unit which is the unit of error-detection.

Figure 7:
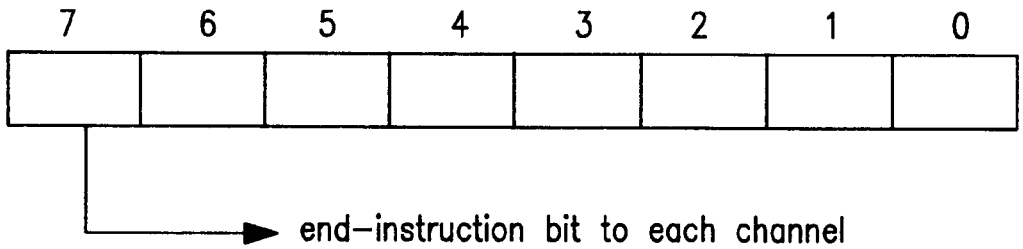
FIG. 7 depicts a memory structure detailing a bit map in the command area of the present invention.
Figure 8:
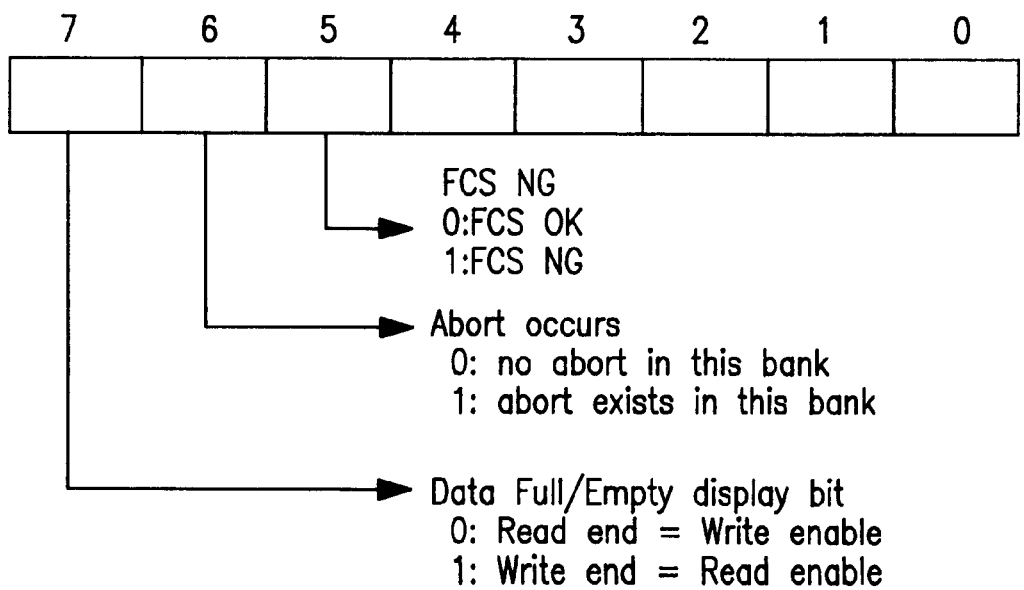
FIG. 8 depicts a memory structure detailing a bit map in the status area in accordance with an exemplary embodiment of the present invention.
Figure 9:
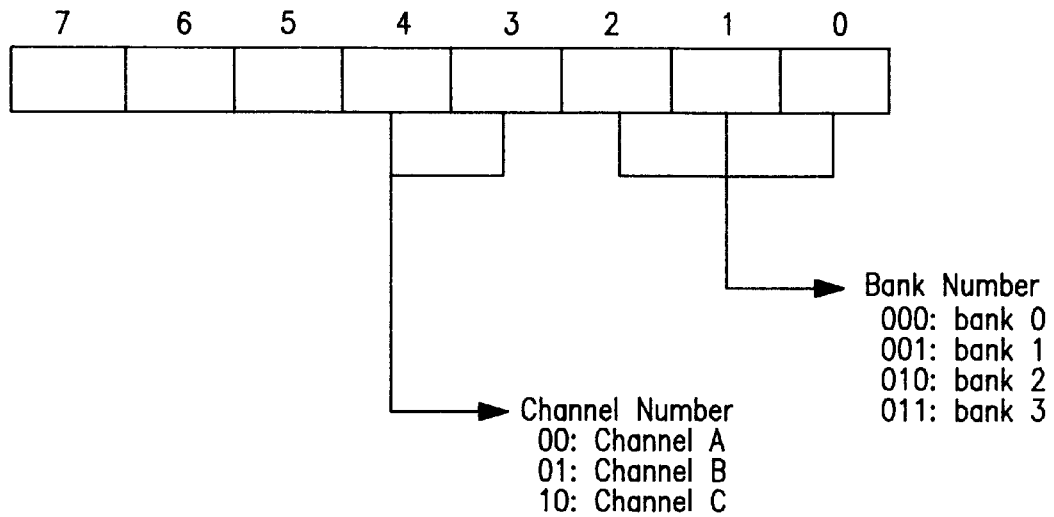
FIG. 9 depicts a memory structure showing a transmission interrupt in accordance with an exemplary embodiment of the present invention.
Figure 10:
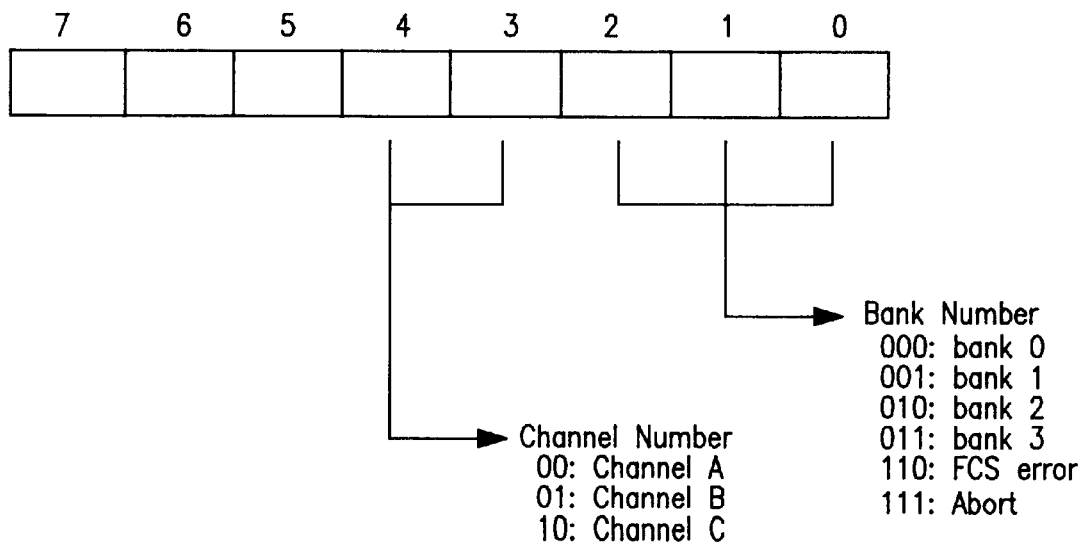
FIG. 10 depicts a memory structure showing a receiving interrupt in accordance with an exemplary embodiment of the present invention.

FIG. 7 details a bit-map in the command area, and FIG. 8 details a bit-map in the status area. These drawings show the command area and status area corresponding to Bank 0. This is similarly applied to Banks 1, 2 and 3. FIG. 9 depicts a memory structure showing a transmit interrupt. FIG. 10 is a memory structure showing a receive interrupt.

Fourth, an operation of the above structure is explained. With respect to the data transmission process, e.g. Channel A among several channels is used, the facsimile controller 12 confirms that the Data Full/Empty display bit of Status 0 is "0", and writes one transmit data-frame into Bank 0. When the write is completed, the facsimile controller 12 changes the ending-channel-instruction-bit to "0" (not end), and changes the Data Full/Empty display bit of Status 0 to "1" (WRITE end=READ enable).

When the MODEM 11 recognizes that the Command 0 ending-channel instruction bit is "0" and the Data Full/Empty display bit of Status 0 is "1", the MODEM 11 reads data from bank 0 to process signals such as demodulation, and transmits data to line L. When the transmission of the data from Bank 0 is complete, the MODEM 11 changes the Data-Full/Empty display bit of status 0 to "0" and simultaneously the interrupt controller 115 produces an interrupt to the facsimile controller 12.

The facsimile controller 12 inspects the transmit-interrupt status shown in FIG. 9, and determines that the MODEM 11 completed the data read from Bank 0. When the Data Full/Empty display bit of Status 1 is "0", the facsimile controller 12 writes the next data-frame into Bank 1 while the MODEM 11 transmits the data from Bank 0. After completing the WRITE, the ending-channel-instruction-bit of Command 1 is changed to "1". The MODEM 11 checks Status 1 after completing the transmission of Bank 0, and when the Data Full/Empty display bit is "1" (in other words, the next data-frame was already written-in, the Bank 1 data is transmitted in an identical manner as the Bank 0 data. If there is no ending-channel-instruction, the MODEM 11 moves to the next bank. Similarly, Banks 2, 3, and 0, in this sequence, are transmitted in the data-frame unit. When ending a data transmission (channel A), a data-frame is written into Bank 3 (for example), the Data Full/Empty display bit of the Bank 3 Status is changed to "1", and simultaneously the ending-channel-instruction-bit of the Bank 3 Command is changed to "1", thereby giving the MODEM 11 an ending notice. The MODEM 11 checks the Bank 3 Status and the Bank 3 Command at the same time, recognizes that both the Data Full/Empty display bit as well as the ending-channel-instruction bit are "1", thereby completing the data transmission process after transmitting the Bank 3 data.

Fifth, a data receiving process is explained here. The MODEM 11 demodulates the received data, and recognizes the Data Full/Empty display bit of Status 0 is "0", and writes one data-frame into Bank 0. When the WRITE is completed, the MODEM 11 changes the Data Full/Empty display bit of Status 0 to "1" (WRITE end—READ enable.) The interrupt controller 115 produces an interrupt to the facsimile controller 12.

The facsimile controller 12 inspects the receiving-interrupt-status, and recognizes that data has been written into Bank 0. When receiving one data-frame, the MODEM 11 checks whether an abort has occurred, inspects a frame-check-sequence which is added to the frame-end, and determines whether an error exists. The result is indicated in the receiving-interrupt-status. After confirming that an abort did not occur, by inspecting the receiving-interrupt-status, and an error is not occurring in the data-frame, the facsimile controller 12 reads the data from Bank 0. When the Data Full/Empty display bit of Bank 0 is "0", the MODEM 11 writes the next data-frame into Bank 1 while the Bank 0 data is read by the facsimile controller 12. After completing the WRITE, the data written into Bank 1 is read by the facsimile controller 12, in the same way as the data in Bank 0 was read. In the same manner, Banks 2, 3 and 0, in this sequence, are processed for receiving the data-frame unit.

Figure 11:
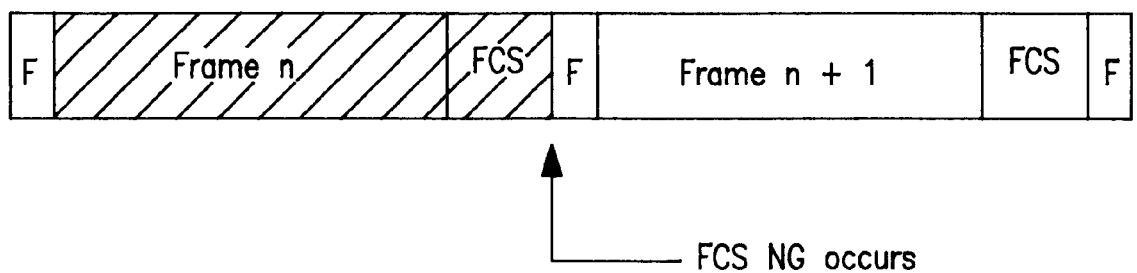
FIG. 11 depicts a situation of an error-frame being detected when a frame of received data is checked.
Figure 12A:
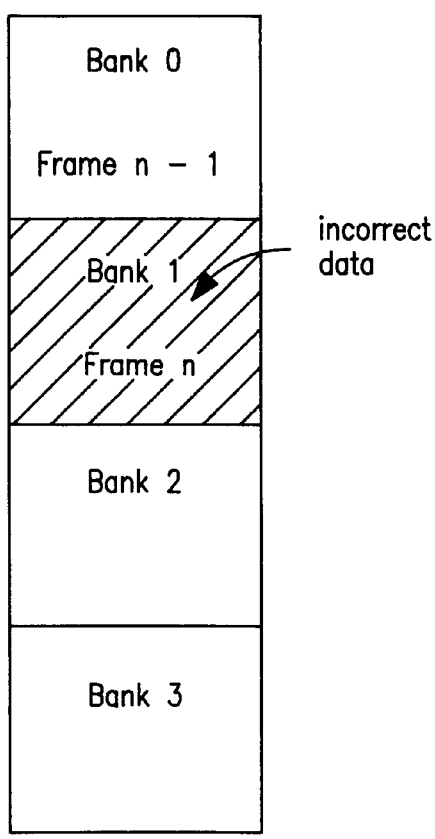
FIG. 12(a) depicts a conventional memory storing an error-frame after error detection.
Figure 12B:
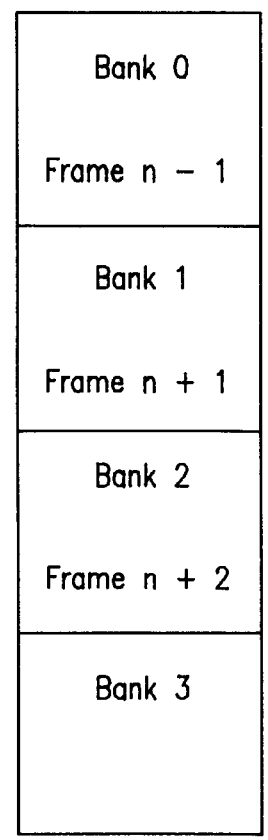
FIG. 12(b) depicts a memory in accordance with an exemplary embodiment of the present invention, which cancels an error-frame after error detection.

When an error occurs in a data-frame or an abort is detected due to line interference while receiving data, how to cancel the error frame is explained by referring to FIG. 11 through FIG. 14. FIG. 11 depicts the status of an error frame detected when the receiving data-frame is checked. FIG. 12(*a*) depicts a memory where an error-frame is still stored even when the frame has been determined to be an error-frame. FIG. 12(*b*) depicts a memory where an error-frame is canceled according to this invention.

Figure 13:
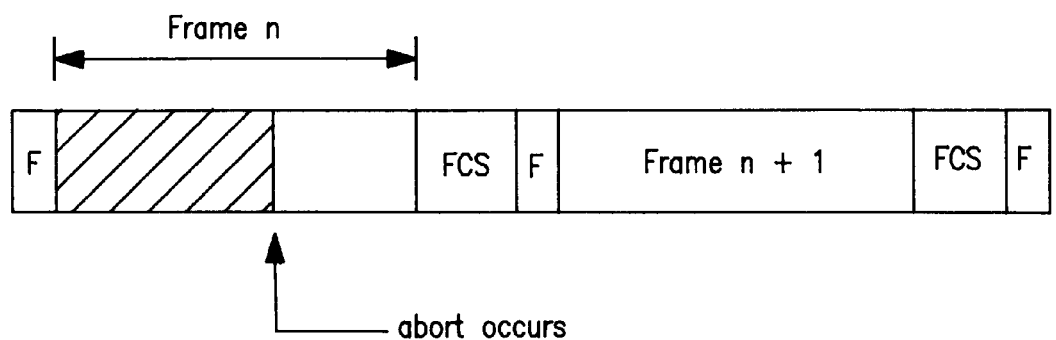
FIG. 13 depicts when an abort is detected in received data.
Figure 14A:
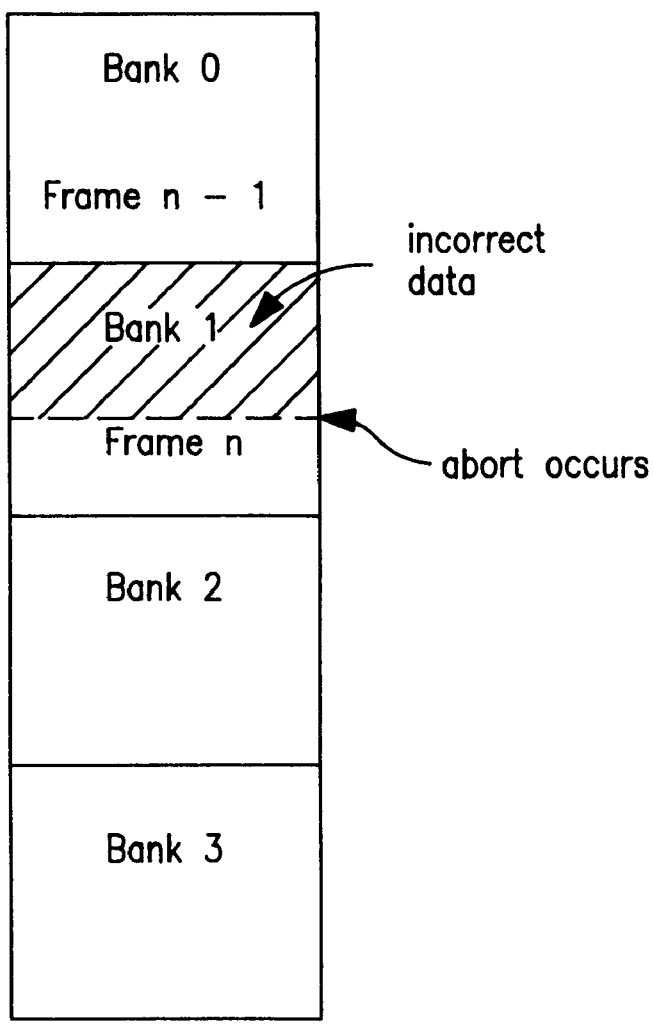
FIG. 14(a) depicts a conventional memory storing an error-frame after error detection.
Figure 14B:
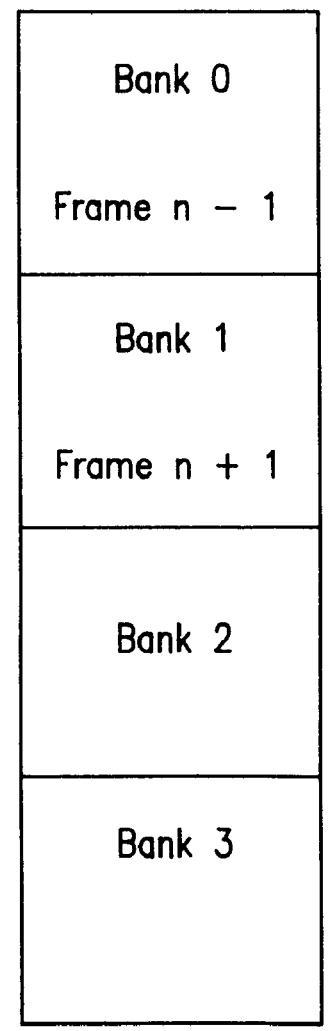
FIG. 14(b) depicts a memory in accordance with an exemplary embodiment of the present invention, which cancels an error frame after error detection.

FIG. 13 depicts received data where an abort is detected. FIG. 14(*a*) depicts a memory where the abort frame is still stored even when the frame has been determined as having an abort. FIG. 14(*b*) depicts a memory where the abort frame is canceled according to this invention.

When an error is detected by an error-detecting-signal (frame-check-sequence-error), a frame n (error-frame) is written into Bank 1, and an interrupt is produced in the facsimile controller 12 by the interrupt controller 115. The facsimile controller 12 inspects the receiving-interrupt-status to find that the data has been written into Bank 1 and that the frame-check-sequence-error also has been written into Bank 1. The facsimile controller 12 does not read the data, because the data in Bank 1 has an error, and waits for the next data-frame.

When receiving the next data-frame n+1, the MODEM 11 does not write data frame n+1 into Bank 2. Rather, data frame n+1 is written into Bank 1 as shown in FIG. 12(*b*). When the WRITE is complete, an interrupt is produced to the facsimile controller 12 by the interrupt controller 115. When receiving the interrupt, the facsimile controller 12 inspects the receiving-interrupt-status to find that the next data-frame n+1 has been written into Bank 1, and completes a receiving process. When the abort occurs, the same procedures are taken as shown in FIG. 13 and FIG. 14(*b*).

Figure 15:
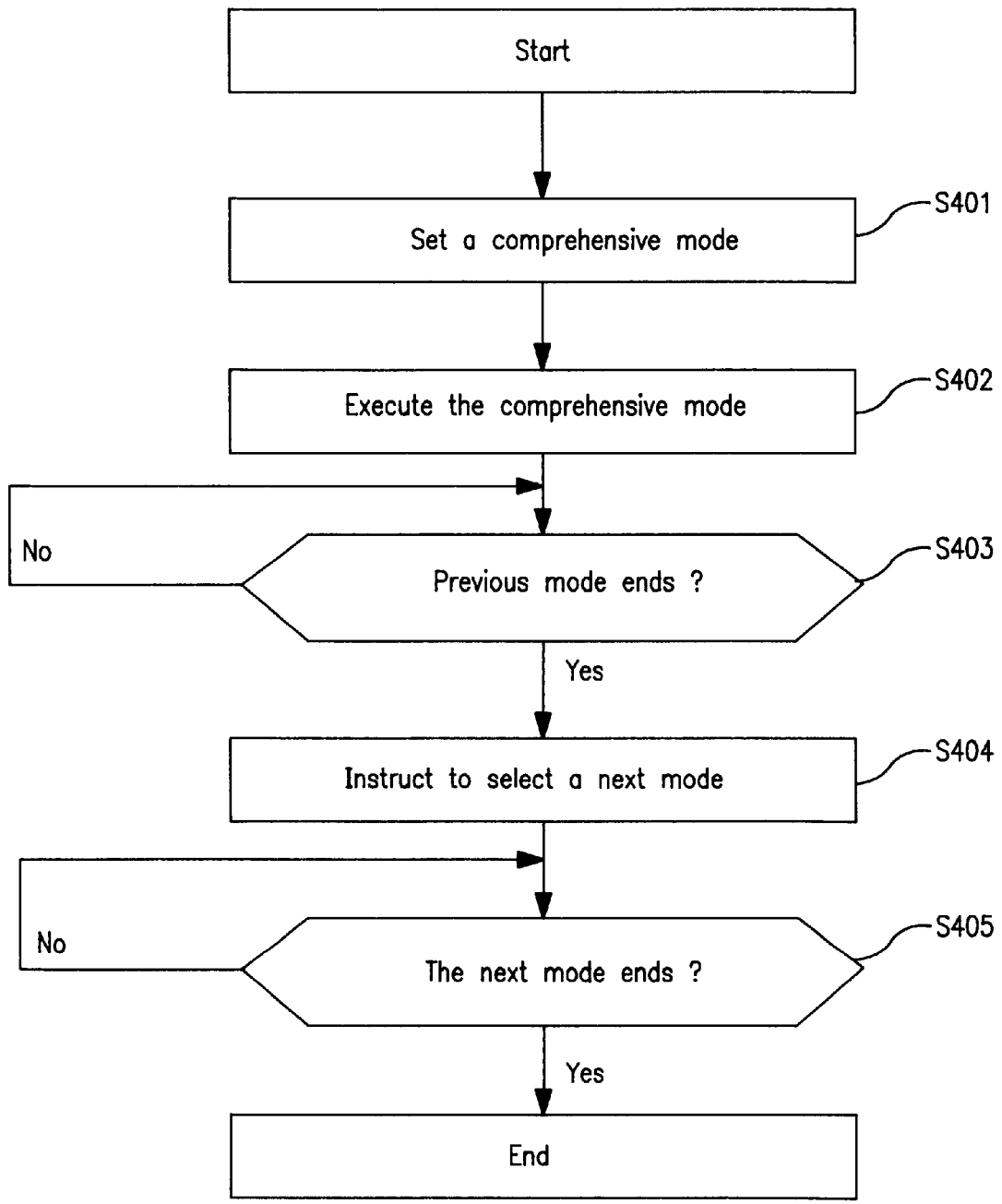
FIG. 15 is a control flow chart depicting of a mode switch in accordance with an exemplary embodiment of the present invention.
Figure 16:
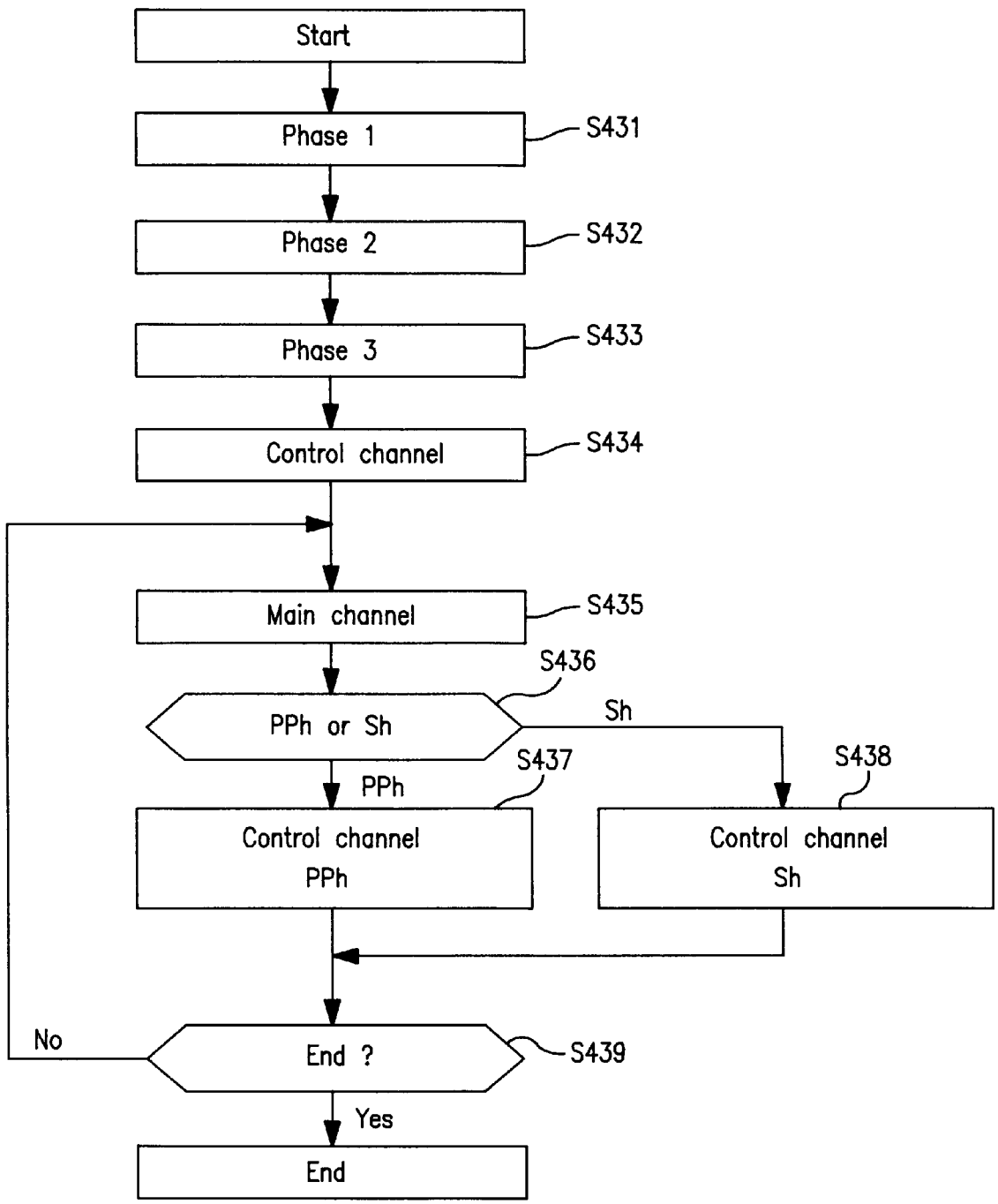
FIG. 16 is a receiving side's flow chart depicting a facsimile sequence using a half duplex mode of the V.34 Standard according to in accordance with an exemplary embodiment of the present invention.
Figure 17:
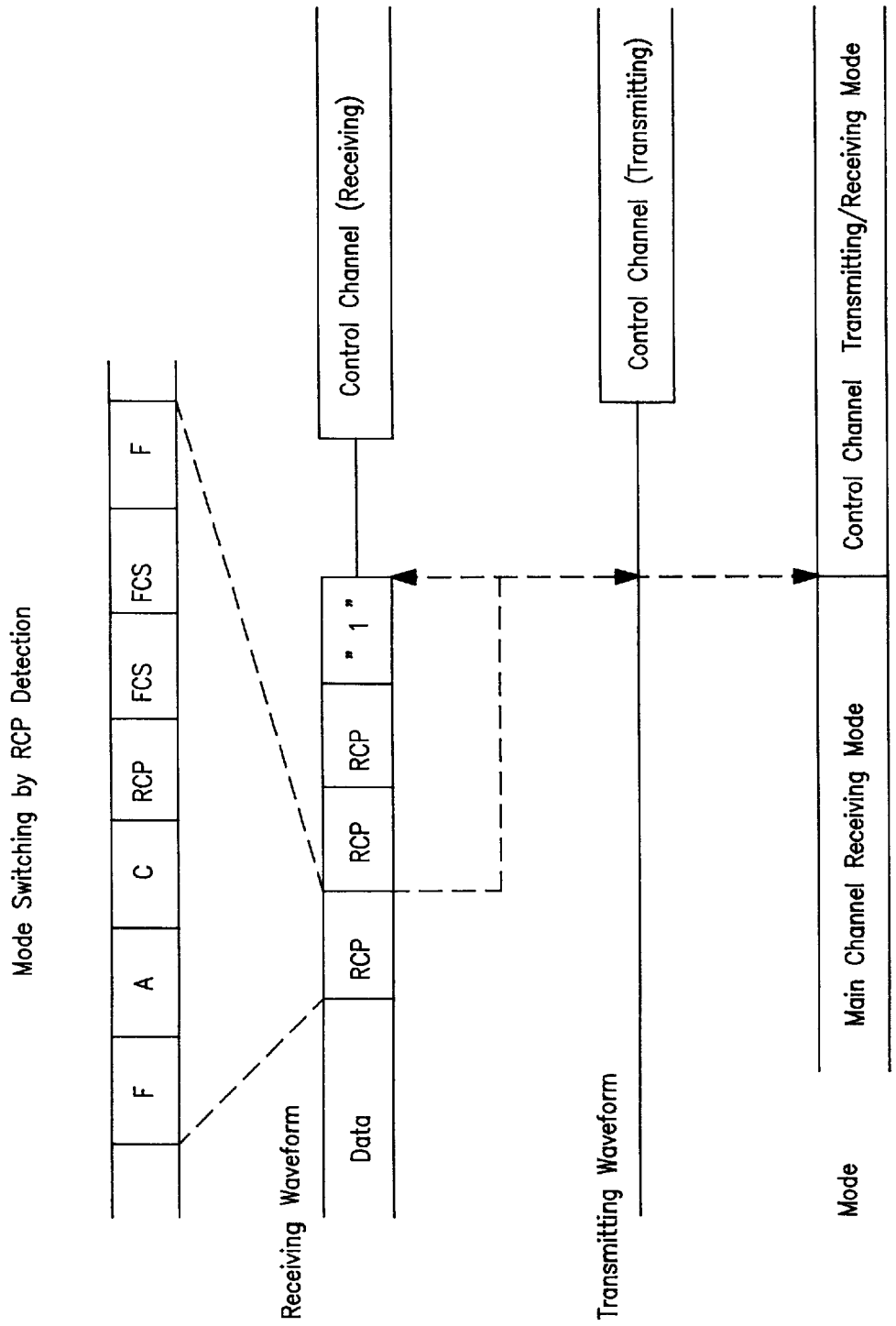
FIG. 17 depicts a mode switch by RCP detection in accordance with an exemplary embodiment of the present invention.

A mode switch process, where the MODEM 11 executes the mode switch by itself, is explained here by referring to FIG. 15 through FIG. 17. FIG. 15 is a control flow chart depicting the mode switch process according to an exemplary embodiment of the present invention.

First, the facsimile controller 12 sets a comprehensive mode (S401) which can control a previous and a next mode in sequence. Second, the MODEM 11 follows an instruction for executing the comprehensive mode (S402) from the facsimile controller 12, and executes S401 to start processing the previous mode. The facsimile controller 12 then waits for a notice from the MODEM 11 that the previous mode has ended (S403). When the previous mode has ended, the MODEM 11 gives a notice of the completion of the previous mode to the facsimile controller 12, and the MODEM 11 sets a timer and monitors the time before the next mode starts. When receiving the notice that the previous mode has ended, the facsimile controller 12 selects one mode from among several modes and instructs the MODEM 11 to execute it in the next mode (S404). The facsimile controller 12 then waits for a notice that the next mode has ended from the MODEM 11 (S405). When the timer times out, the MODEM 11 executes the selected mode and monitors the status before giving a notice of completion of the next mode to the facsimile controller 12. When receiving the notice of completion of the next mode, the facsimile controller 12 ends the sequence of the comprehensive mode.

As explained above, according to this invention, the MODEM 11 automatically executes the mode switch process by simply following the mode setting instructions from the facsimile controller 12. There is no need to wait for a mode-switch-instruction or process-start-instruction from the facsimile controller 12. Therefore, according to an exemplary embodiment of the present invention a response delay to the next mode is prevented even where ±5 ms accuracy is required for monitoring the signal-gap-length.

In other words, if the MODEM stores a communication sequence beforehand and the comprehensive mode is set to identify which mode is to be executed, the MODEM can execute the process by itself by controlling a status transition.

In addition, according to an exemplary embodiment of the present invention, the MODEM monitors the timing required until the next mode starts. Therefore a delay in switching to the next mode can be avoided even when ±5 ms accuracy in monitoring the signal-gap-length is desired.

As shown in FIG. 15, an exemplary embodiment of the present invention proves the following benefits: When the process of the previous mode ends at S403, the MODEM 11 controls a status-transition and also the next mode is set at S404 by the instruction of selecting the next mode, thereby guaranteeing the timing for the mode-switch resulting in efficient communication. Further, the MODEM can monitor the timing instead of the facsimile controller 12, thereby reducing the load on the facsimile controller 12.

Various mode-switches by the MODEM are explained. FIG. 16 shows that the MODEM 11 has several operational-modes and another operational mode having a sequence which controls the several operational-modes. FIG. 16 is a flow-chart of a facsimile sequence using the half-duplex V.34 Standard based on the ITU. Phase 1 (S431), Phase 2 (S432), Phase 3 (S433), the controlling channel (S434), and the main channel (S435) are the modes in the sequence. The MODEM 11 has the half-duplex mode of the V.34 Standard into which these modes are combined.

A MODEM mode is set as the V.34 half-duplex mode before the operation is started. Phase 1 of Step S431 starts, where an adjustment is made so that the data based on the V.34 Standard can be transmitted/received. When Step S431 is complete, the MODEM 11 transfers to Phase 2 of Step S432 to determine the line's characteristics and the symbol speed of the MODEM. At Step S433, the MODEM is at Phase 3 where equalizer-training (set a coefficient in order to determine distortion components) to the MODEM 11 is provided. After Phase 3, the MODEM is at Step S434, the control channel, where the data speed is determined and terminal information of the T.30 Standard is exchanged.

When the control channel ends, the MODEM is at Step S435, the main channel, where the image data of the facsimile is transferred. When the main channel ends, the MODEM enters Step S436 to determine what to do next. Based on an instruction from facsimile controller 12, the MODEM will either proceed to 1) Step S437, where the control channel resets the data-speed, or 2) to Step S438, where the control channel does not reset the data-speed. Facsimile controller 12 gives this instruction to the MODEM 11 to determine the next step, S437 or S438, before completing the main channel in Step S435.

The MODEM 11 in Step S439, after completing either Step S437 or Step S438, determines whether the operation is to end. When the operation does not end, the MODEM returns to Step S435, and continues to receive the main channel data. Otherwise, the MODEM ends the operation. The non-signal period between Phase 1 and Phase 2 is 75±5 msec, and other non-signal periods between any modes is 70±5 msec. If the facsimile controller 12 controls the modes, the facsimile controller 12 has additional functions to perform. According to an exemplary embodiment of the present invention, the MODEM controls the modes in lieu of the facsimile controller 12 so that the load on the facsimile controller 12 is reduced.

The above description is for the MODEM 11 to switch the modes by itself (the main channel, transmitting the control channel, and receiving the control channel.) By referring to FIG. 17 and FIG. 18, it is explained that the MODEM 11 itself detects the end of the mode shown in S403 and S405 in FIG. 15. FIG. 17 depicts MODEM mode switching by RCP detection.

This is an example where a facsimile communication or data communication is executed in accordance with the V.34 Standard. FIG. 17 shows a mode switching timing from the main channel upon completion to the control channel mode. Since the facsimile/data communication based on the V.34 Standard is operated in an error coorection mode (ECM) based on "error-retransmitting", it is certain that the main channel ends with an RCP frame which is an end signal of a partial page. If the MODEM can determine the RCP frame in the MODEM, and can switch the mode to the control mode, the MODEM never misses the control-channel-signal arriving within 75 ms after the main channel ends. The RCP frame is structured by the High-level Data Link Control framing method (HDLC), and the MODEM 11 desirably has the ability to execute a deframing operation. After deframing, if the data is determined to be correct, it is easy to analyze the RCF BYTE.

Figure 18:
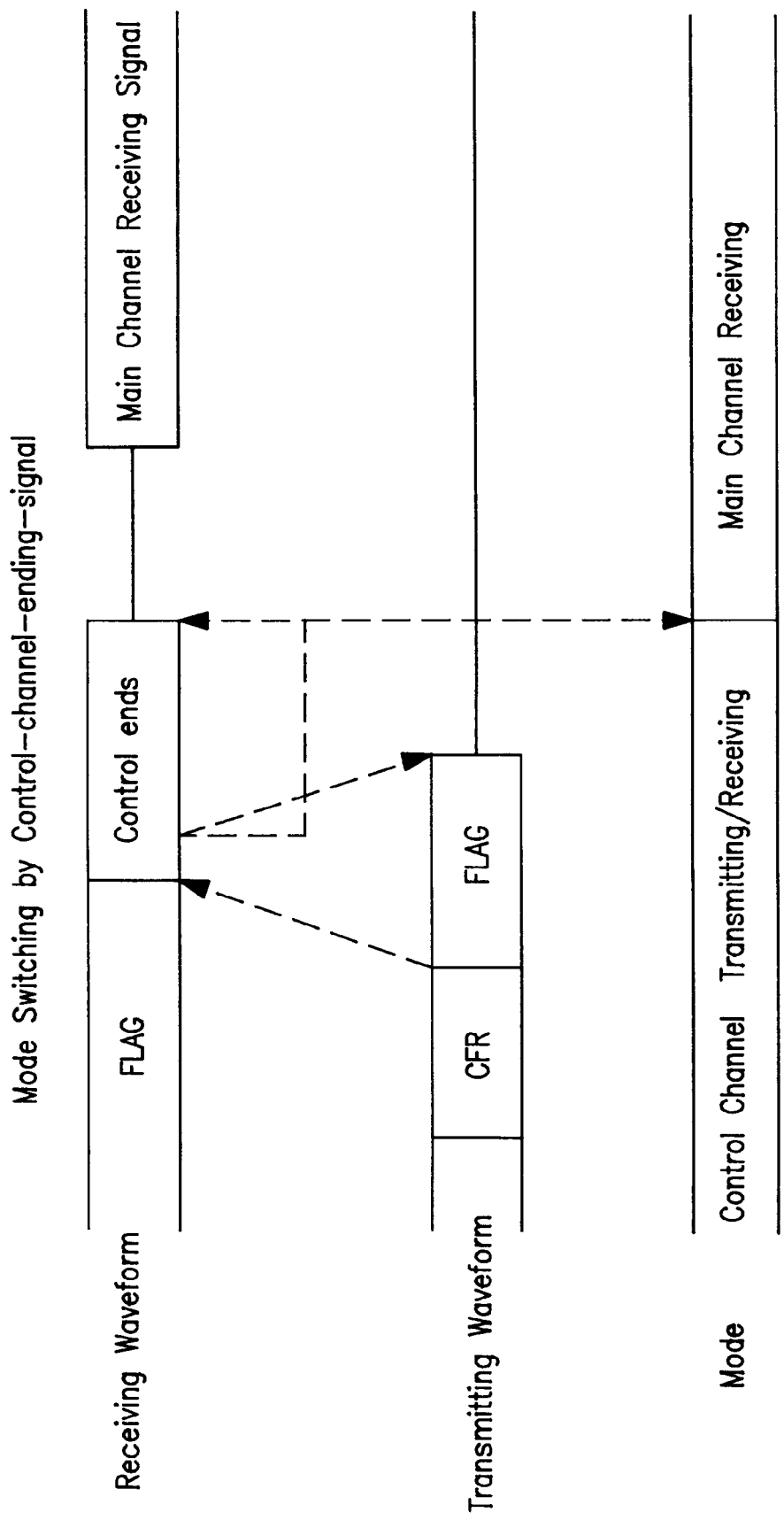
FIG. 18 depicts a sample of timing used in facsimile/data communication in the V.34 mode in accordance with an exemplary embodiment of the present invention.

Another embodiment of the present invention, where the MODEM 11 switches modes by itself, is explained by referring to FIG. 18. FIG. 18 shows an example of timing in which a facsimile/data communication in accordance with the V.34 Standard is operated. In particular, it shows the timing with which the control channel mode, upon completion, is switched to the main channel receiving mode.

Regarding the end of the control signal, the channel ending signal is specified by a rule of protocol. In this case also, the channel end is determined by the MODEM 11 itself rather than by the facsimile controller 12, thereby switching the mode to the main receiving mode. Specifically, the channel ending signal is a sequence of consecutive "1s" of not less than 40 bits, which can be detected in the MODEM.

As explained above, the MODEM 11 analyzes the received data, and when the analysis indicates that the specified signal has been detected, the MODEM switches the mode based on the result of the detection. Therefore, the MODEM never misses the switch timing and can guarantee error-free communications.

Figure 19:
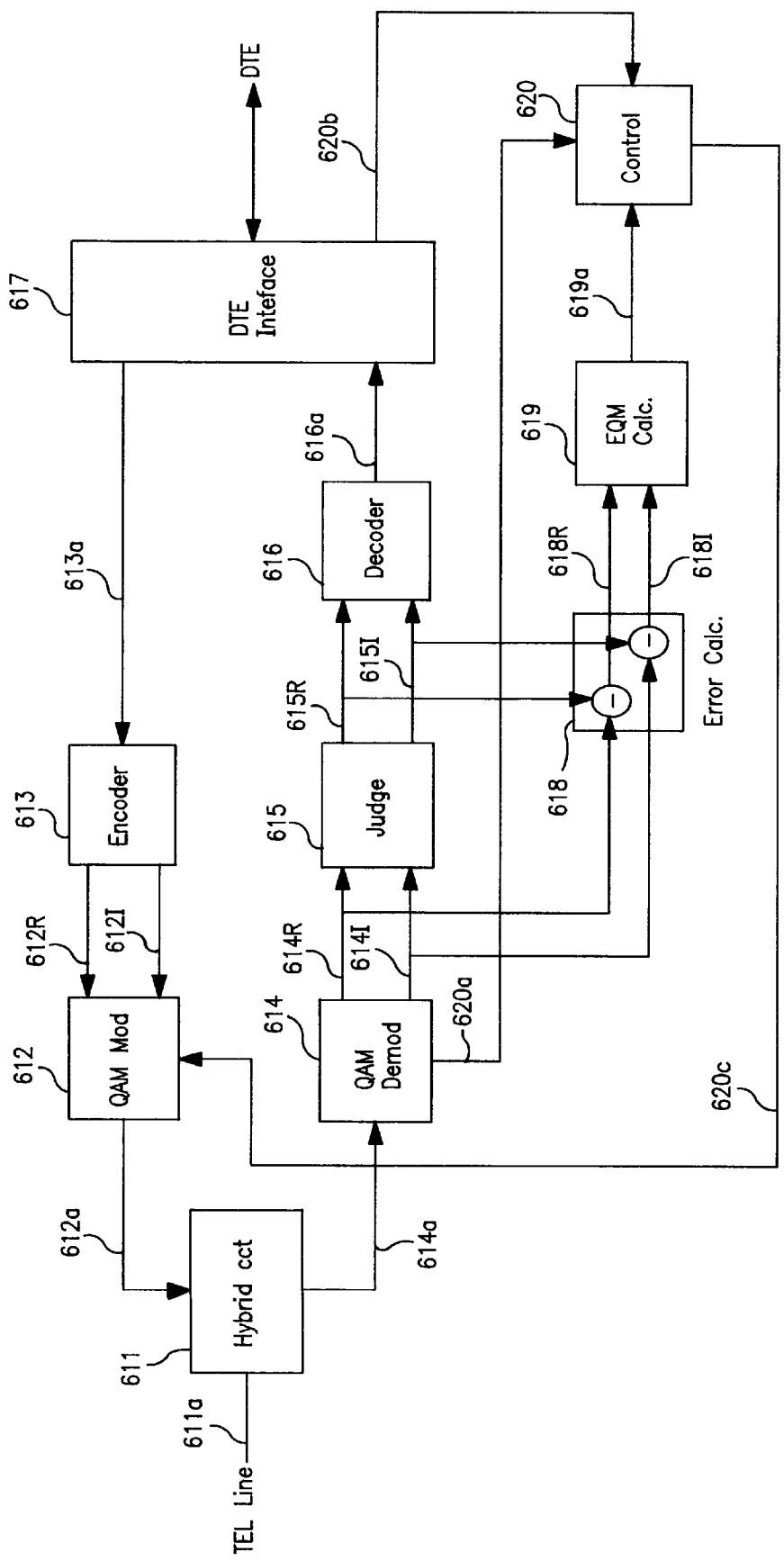
FIG. 19 depicts a circuit of a MODEM used in accordance with an exemplary embodiment of the present invention.
Figure 20:
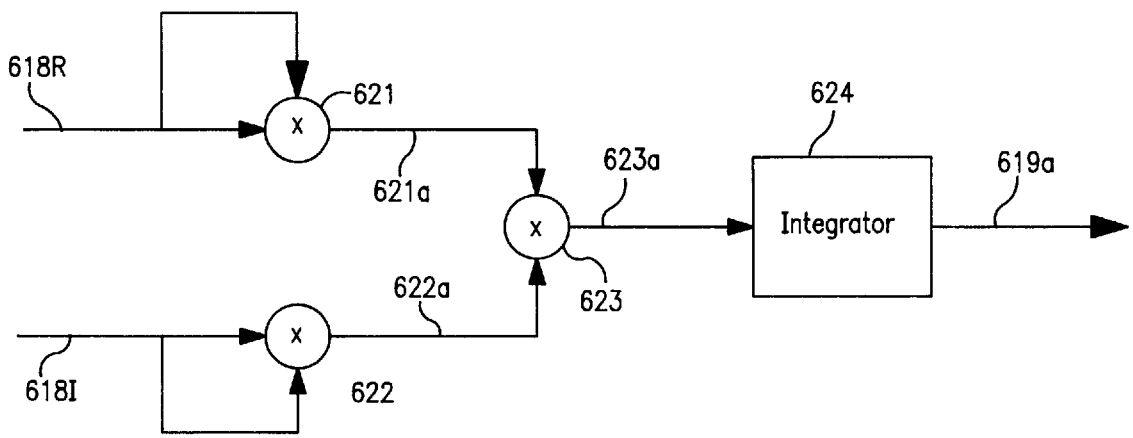
FIG. 20 is an internal block diagram of the EQM calculator as shown in FIG. 19. (EQM: eye quality monitor)
Figure 21:
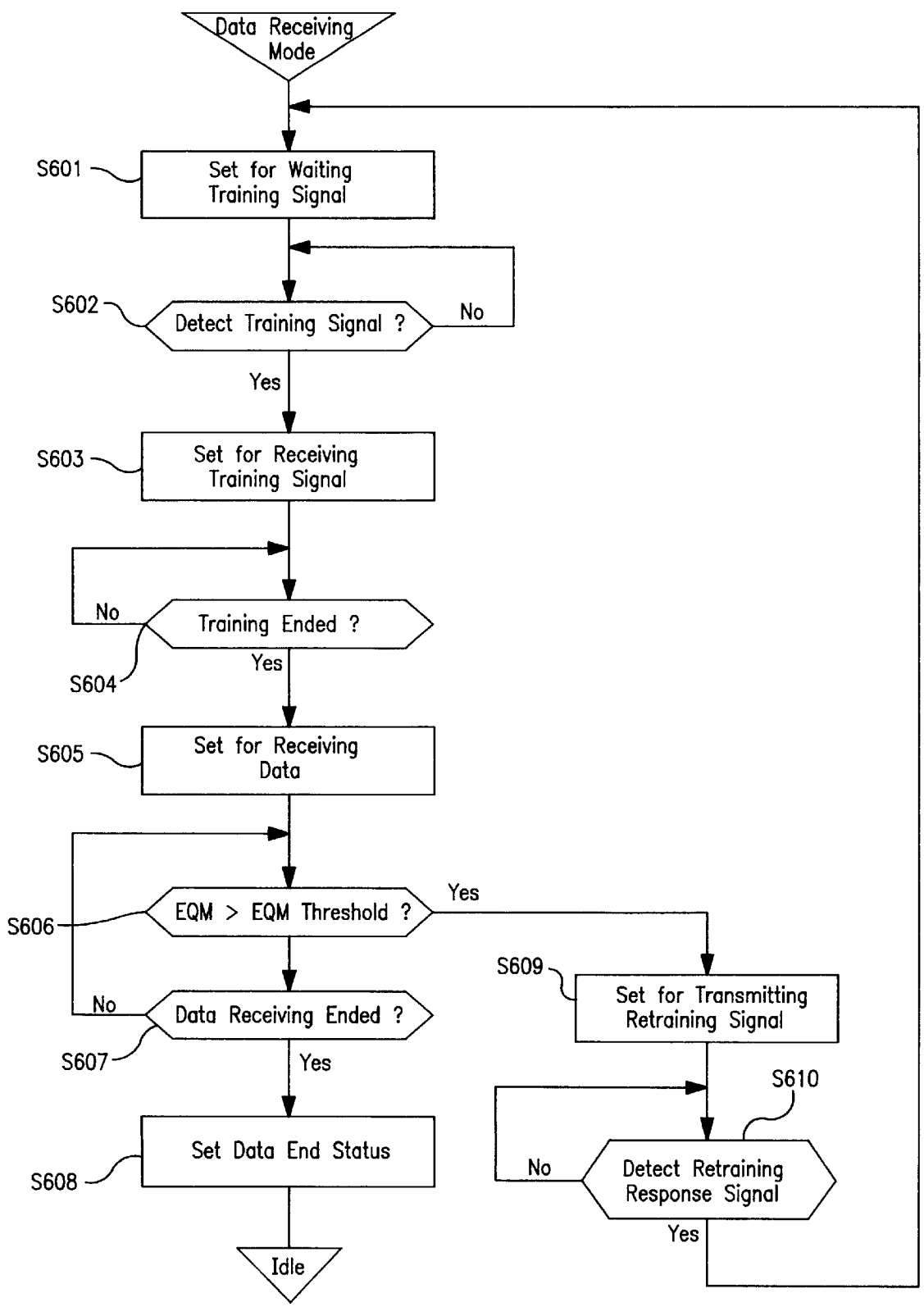
FIG. 21 is a flow chart to be executed by the controller as shown in FIG. 19 while in the data receiving mode.

FIG. 19 through FIG. 21 depict an instruction process whereby the MODEM 11 instructs the facsimile controller 12 into the retraining mode. FIG. 19 is a circuit diagram of MODEM 11, which shows an exemplary embodiment of the present invention. In FIG. 19, a DTE-interface 617 controls data-transmission such as transmitted/received data as well as other data including instructions of modes, operations, etc. between the DTE and the MODEM. Transmitted data 613a is sent from the DTE to the other party of the communication via the DTE-interface 617. Received data 616a is transmitted from the other party to the DTE via the DTE-interface 617. An EQM threshold-value-signal 620b is a reference value for determining a retraining control of the MODEM by the DTE via the DTE-interface 617. An encoder 613 transduces the transmitted data 613a into two-dimensional-signals 612R and 612I. A quadrature amplitude modulator (QAM) 612 provides quadrature amplitude modulation to the two dimensional signals.

The QAM modulator 612 is controlled so that the following signals are output as a modulated signal 612a in response to the status of control signal 620c:

Where: 620c=0, no signal

620c=1, quadrature amplitude modulation signal of the two dimensional signals 612R and 612I 620c=2, training signal 620c=3, retraining signal 620c=4, response signal of retraining A hybrid circuit 611 separates the signals of the transmitting system from those of the receiving system. This hybrid circuit sends out the transmitted signal 612a to a telephone line 611a, and outputs a received signal 614a from the other party.

QAM demodulator 614 has two functions, namely 1) for providing quadrature amplitude modulation to the received signal 614a to output a two-dimensional-signal 614R and 614I, and 2) for outputting a judgment of the received signal 614a as a judging signal 620a. The QAM demodulator 614 outputs as follows in response to the status of received signal 614a:

| When received signal 614a | = no signal, 620a = 0 |
|---|---|
| | = data receiving signal, 620a = 1 |
| | = training signal, 620a = 2 |
| | = retraining signal, 620a = 3 |
| | = retraining signal, 620a = 4 |

A judging part 615 analyses the two dimensional signals 614R and 614I. The analyzed signals 614R and 614I are tapped off from the judging part 615

A decoder 616 decodes the signals 615R and 615I into received data 616a. An error counter 618 subtracts output signals 615R of judging part 615 from the output signal 614R of QAM demodulator 614, and also subtracts the output signals 615I of the judging part 615 from the output signal 614I of the QAM demodulator 614, and outputs a two-dimensional-error signal 618 and 618I. The eye quality monitor calculator 619 (EQM) calculates the power of the two-dimensional-error-signals 618R and 618I, and then outputs an EQM signal 619a representing the quality of the received data. Controller 620 receives inputs consisting of three signals, namely, the EQM signal 619a, the EQM threshold value 620b, which is a reference value for retraining, the identifying signal 620a, which identifies the received signal. Controller 620 outputs a control signal 620c to the QAM modulator 612.

FIG. 20 is a block diagram of the EQM calculator 619. Multipliers 621 and 622 square the two-dimensional-error-signals 618R and 618I, respectively. Adder 623 adds the signals squared by multipliers 621 and 622 and outputs a power signal 623a of the two-dimensional-error. Integrator 624 smoothes the power signal 623a of two-dimensional-error, and outputs the EQM signal 619a representing the quality of receiving data.

FIG. 21 is a flow diagram which illustrates the steps which may be executed in data-receiving-mode by the controller 620 shown in FIG. 19. Step S601 sets the MODEM into a waiting status for the training signal to be detected, and sets the signal 620c to "0" instructing QAM modulator 612 not to send a signal. Step S602 judges whether the MODEM 11 detected the training signal sent from the MODEM of the other party to the communication. When S602 determines a "detected" state, the operation moves to S603, otherwise, the operation repeats step S602. When signal 620a changes to "2", the training signal has been detected. In step S603, the MODEM is set in training-signal-receiving-status. In step S604, the controller 620 determines whether the training-signal-receiving has ended. When the training-signal-receiving ends, the operation moves to S605, otherwise S604 is repeated. When the signal 620a changes from "2" to "1", the training-signal-receiving has ended.

In step S605, the MODEM is set to the receive mode, where received data is transmitted to the DTE via the QAM demodulator 614, judging part 615, decoder 616 and DTE-interface 617. Step S606 judges whether the EQM signal 619a representing the quality of receiving data exceeds the EQM threshold value 620b or not. When the EQM signal 619a exceeds the threshold value 620b, the operation moves to step S609, and when the threshold value 620b exceeds the EQM signal 619a, the operation moves to step S607

Step S607 determines whether data-receiving is completed. When the data-receiving is completed, the operation moves to Step S608, otherwise the operation returns to Step S606. The criteria for this determination is: when signal 620a changes from "1" to "0", and when an "end" state is instructed by the DTE via the DTE-interface 617.

Step S608 sets the MODEM to a data-ending status, stops the received data from further transmission to the DTE via the DTE-interface 617, and enters an idle mode. Step S609 sets the MODEM to a retraining-signal-transmitting status, changes the signal S620c to "3", transmits the retraining signal from the QAM modulator 612, and moves to Step S610. At this time, the operation temporarily stops the received data from being transmitted to the DTE via the DTE-interface. Step S610 determines whether the MODEM 11 detected a retraining response signal from the MODEM of the other party to the communication. When a "detected" state is entered, the operation repeats Step S601, otherwise the operation repeats Step S610. The criteria for this determination is: when signal 620a changes to "4", it is determined that the retraining signal is detected.

In the above embodiments, retraining is controlled by both the EQM threshold value set by the DTE and the EQM value set by the MODEM 11. However, this invention is not limited to these embodiments, but has other structures for controlling the training. For example, a frame-error or bit-error is monitored in the MODEM, and the DTE sets a threshold value to the monitoring, thereby the training is controlled. According to the above embodiments, the DTE controls the EQM threshold value. However, the EQM threshold value may be held before-hand by the MODEM.

Figure 22:
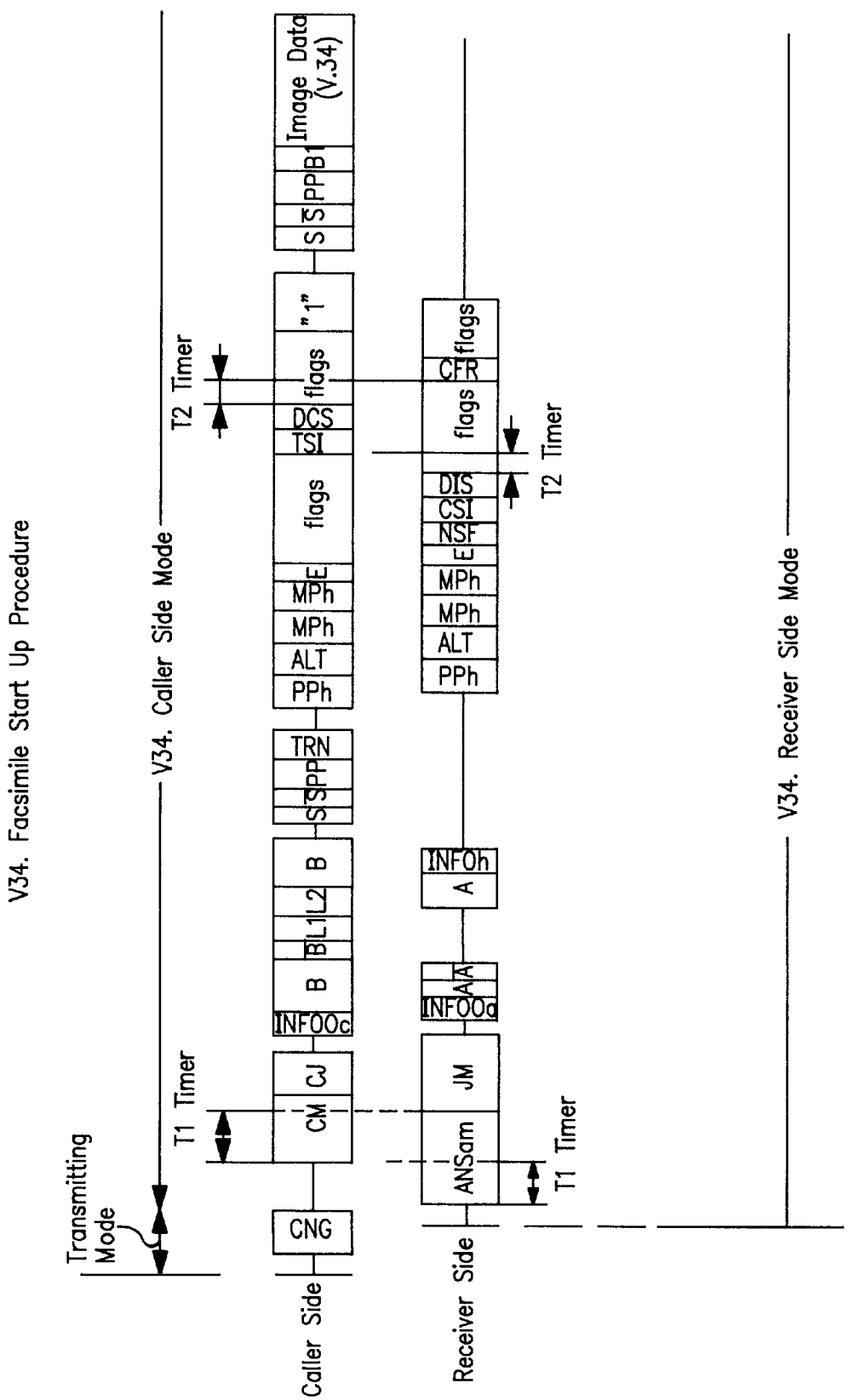
FIG. 22 is a sequence diagram outlining a procedure of the V.34 half duplex communication mode used in accordance with an exemplary embodiment of the present invention.

Next, a process of monitoring the timing by the MODEM is explained. FIG. 22 is a sequence diagram outlining the procedure of the V.34 Standard half-duplex mode. First, a timer T1 works as follows: On the receiver side, concurrent with the transmission of the Answer tone (ANSam) signal is the decrementing of the time (e.g. 35 seconds) set in timer T1. If timer T1 counts down to "0", the MODEM 11 gives an abnormal indication by producing an interrupt to the DTE side. However, when a Call Menu (CM) signal from a caller is detected before the timer T1 counts down to "0", the decrementing of timer T1 is stopped.

On the caller side, concurrent with the receiving the ANSam signal, is the decrementing of time (e.g. 35 seconds) set in timer T1 provided from the facsimile 12. If timer T1 counts down to "0", the MODEM produces an interrupt to the DTE side, thereby giving an abnormal indication. If, a JM signal from the receiver side is detected before the timer T1 counts down to "0", however, the decrementing of timer T1 is stopped.

It is possible to start the decrementing on both sides, i.e. the caller side and receiver side, at the same time when the terminal is linked to the telephone line.

Second, a timer T2 works as follows: On the receiver side, at the same time as the transmission of the Non-Standard Facilities (NSF), Called Subscriber Identification (CSI) and Digital Identification Signal (DIS) signals ends, the decrementing of time (e.g. 6 seconds) set in the timer T2 provided from the DTE side starts. If the timer T2 counts down to "0", the MODEM produces an interrupt, thereby indicating an abnormal condition. However, before the timer T2 counts down to "0", if the signals Transmitting Subscriber Identification (TSI) and Digital Command Signal (DCS) are detected from an address byte to control byte according to HDLC format, then the decrementing of timer T2 stops and timer T2 is returned to its original time, thereby avoiding an interrupt indicating an abnormality. As explained above, this invention only gives a notice that an abnormality has occurred. When an operation is normal, the DTE need not be informed of normal operation. Therefore, in this method such notice is given only when an abnormality occurs, thereby reducing the load on the facsimile controller 12.

On the caller side, at the same time when transmission of the TSI and DCS signals ends, the decrementing of time (e.g. 6 seconds) set in the timer T2 provided from the DTE side starts. If the Timer T2 counts down to "0", the MODEM produces an interrupt to the DTE side, thereby indicating an abnormal condition. However, before the timer T2 counts down to "0", if the Confirm to Reveive (CFR) signal is detected from the address to control bytes following the HDLC format, the decrementing of the timer T2 stops and timer T2 returns to its original time, thereby avoiding an interrupt indicating an abnormality.

The above exemplary embodiment handles the timer T2 put in just after Phase B moves from Phase A. Regarding the control signals including the Multipage (MPS) signal between pages, End of Procedure (EOP) and Message Confirmation (MCF) signals in Phase B passing through Phase C, the DTE side can monitor timer 2 easily using the same method.

What is claimed is:

1. A modulator and demodulator (MODEM) for communicating between a data terminal equipment (DTE) and a signal line, said modem comprising:

(a) memory means for storing an object program containing a plurality of control procedures;

(b) switching means for switching between a plurality of operational modes responsive to said object program, and (c) control means for executing a respective one of said plurality of control procedures corresponding to a current one of said plurality of operational modes, wherein said memory means has a first area for storing a command from said data terminal equipment (DTE) and a second area for storing data from the data terminal equipment (DTE) in pairs, each of said pairs corresponding to a respective one of said modes, said control means is further for transmitting the data stored in said second area of said memory means to said signal line while inputting a command for storing from the DTE to the first area corresponding to said second area, and when completing the transmitting of the data stored in said second area, said control means determines whether the transmission of the data from said second area is completed based on the command stored in said first area.

2. A modulator and demodulator (MODEM) for communicating between a data terminal equipment and a signal line, said modem comprising:

(a) memory means for storing an object program containing a plurality of control procedures;

(b) switching means for switching between a plurality of operational modes responsive to said object program, and (c) control means for executing a respective one of said plurality of control procedures corresponding to a current one of said plurality of operational modes, wherein said memory means has a plurality of banks, and also has a respective plurality of data storage areas for each mode, said plurality of data storage areas store the data from said data terminal equipment in a frame unit into said plurality of banks.

3. A modulator and demodulator (MODEM) for communicating between a data terminal equipment and a signal line, said modem comprising:

(a) memory means for storing an object program containing a plurality of control procedures;

(b) switching means for switching between a plurality of operational modes responsive to said object program, and (c) control means for executing a respective one of said plurality of control procedures corresponding to a current one of said plurality of operational modes, wherein said memory means has a plurality of banks, a respective plurality of command areas and a respective plurality of status areas, wherein said plurality of command areas store information about a respective plurality of operation instructions, and said plurality of status areas store information showing a respective plurality of buffer status.

4. The MODEM of claim 3 wherein the control means provides an error check of received data from the signal line, and when an error is detected in the received data, a "data-error" bit is written into one of said plurality of status areas, and the received data is deleted from the respective data storage area.

5. The MODEM of claim 3 wherein the buffer status includes one of a Data Full/Empty condition, abort condition and error condition.

6. A modulator and demodulator (MODEM) for use with a data terminal equipment and a signal line comprising:
   memory means for storing an object program containing a plurality of control procedures,
   analysis means for deframing a received data-frame and analyzing the received data-frame,
   switching means for switching an operational mode from a main-channel-mode to a control-channel-mode when said analysis means indicates that the received data-frame is an RCP (return to control for partial page) frame, and
   control means for executing a procedure corresponding to the optional mode switched to.

7. A modulator and demodulator (MODEM) for use with a data terminal equipment and a signal line comprising:
   (a) memory means for storing an object program containing a plurality of control procedures,
   (b) analysis means for analyzing a signal received during data transmitting,
   (c) switching means for switching an operational mode from a control-channel-mode to a main-channel-receiving-mode when said analysis means determines that a control-channel-ending-signal comprising a special pattern has been absent during data transmitting, and
   (d) control means for executing a procedure corresponding to the operational mode switched to.

8. A modulator and demodulator (MODEM) for communicating between a data terminal equipment and a signal line, said modem comprising:
   (a) memory means for storing an object program containing a plurality of control procedures;
   (b) switching means for switching between a plurality of operational modes responsive to said object program, and
   (c) control means for executing a respective one of said plurality of control procedures corresponding to a current one of said plurality of operational modes,
   (d) modulating means for outputting a modulated signal to the signal line,
   (e) demodulating means for outputting a demodulated signal from a received signal fed from the signal line,
   (f) error counting means for counting errors of said demodulated signal,
   (g) specifying means for specifying an acceptable maximum error volume, and
   (h) further control means for controlling said modulating means to transmit a retraining signal to the signal line when an error volume counted by said error counting means exceeds said acceptable maximum error volume.

9. The MODEM of claim 8 wherein said acceptable maximum error volume is specified by the data terminal equipment.

10. A modulator and demodulator (MODEM) use with a data terminal equipment and a signal line comprising:
    (a) memory means for storing an object program containing a plurality of control procedures,
    (b) switching means for switching between a plurality of operational modes responsive to said object program,
    (c) control means for executing a procedure corresponding to the mode just switched,
    (d) transmitting means for transmitting a specified signal to the signal line,
    (e) timer means for counting a specified time when said transmitting means has started to transmit the specified signal,
    (f) reset means for resetting said timer means when a response signal to said specified signal is detected from the signal line during the specified time, and
    (g) notifying means for notifying the data terminal equipment of an abnormality when the specified time expires before said response signal is detected from said signal line.

11. A modulator and demodulator (MODEM) for use with a data terminal equipment (DTE) and a signal line comprising:
    (a) an interface for 1) sending data to and 2) receiving data from the data terminal equipment (DTE),
    (b) an encoder for transducing transmitted data into a first signal,
    (c) a modulator for providing a modulation to the first signal,
    (d) a hybrid circuit connected to the signal line for separating transmitted signals and received signals,
    (e) a demodulator providing a demodulation to convert one of said received signals into a second signal,
    (f) a judging part for converting s aid second signal into a third signal,
    (g) a decoder for transducing the third signal from said judging part into a further received data,
    (h) an error counter which generates an error-signal by using said second signal and said third signal,
    (i) a calculator for calculating a power of said error-signal, and outputting a quality signal of the received data, and
    (j) a controller for inputting the following three signals:
       1. the quality signal of the received data from said calculator,
       2. a reference signal for determining a retraining control, said reference signal selected by the DTE,
       3. an identifying signal from said demodulator for identifying said one of said received signals,
    said controller generating a control signal for controlling said modulator.

12. A data communication equipment comprising:
    (a) a data terminal equipment (DTE),
    (b) a modulator and demodulator (MODEM) connected to a communication line, said MODEM comprising:
       (1) memory means for storing an object program containing a plurality of control procedures,
       (2) switching means for switching a mode from a plurality of modes in said data communication equipment in response to the execution of said object program, and
       (3) control means for executing one of said plurality of procedures corresponding to a respective current mode, wherein said memory means has a plurality of areas for storing data from the DTE for each of said plurality of modes, and when said switching means switches the mode, the control means stores further data into a further one of said plurality of areas different from the area where the data corresponding to a previous mode is stored.

13. A data communication equipment comprising:
    (a) a data terminal equipment (DTE),
    (b) a modulator and demodulator (MODEM) connected to a communication line, said MODEM comprising:
       (1) memory means for storing an object program containing a plurality of control procedures, (2) switching means for switching a mode from a plurality of modes in said data communication equipment in response to the execution of said object program, and (3) control means for executing one of said plurality of procedures corresponding to a respective current mode, wherein said memory means has a first area for storing a command for the DTE and a respective second area for storing data from the DTE in a pair corresponding to each of said plurality of modes, said control means transmits the data stored in said respective second area of said memory means to a signal line while inputting a command for storing data from the DTE to the first area corresponding to said respective second area, and when completing the transmission of the data stored in said respective second area, said control means determines whether the transmission of the data from said respective second area is to be terminated based on the command stored in said first area.

14. A data communication equipment comprising:
(a) a data terminal equipment (DTE),
(b) a modulator and demodulator (MODEM) connected to a communication line, said MODEM comprising:
  (1) memory means for storing an object program containing a plurality of control procedures,
  (2) switching means for switching a mode from a plurality of modes in said data communication equipment in response to the execution of said object program, and
  (3) control means for executing one of said plurality of procedures corresponding to a respective current mode, wherein said memory means has a plurality of banks, and also has a plurality of data storage areas for each of the plurality of modes, the data storage areas store the data from the DTE in a frame unit into said plurality of banks.

15. A data communication equipment comprising:
(a) a data terminal equipment (DTE),
(b) a modulator and demodulator (MODEM) connected to a communication line, said MODEM comprising:
  (1) memory means for storing an object program containing a plurality of control procedures,
  (2) switching means for switching a mode from a plurality of modes in said data communication equipment in response to the execution of said object program, and
  (3) control means for executing one of said plurality of procedures corresponding to a respective current mode, and
(c) timer means for monitoring a transition time between a completed procedure and a further procedure, said data communication equipment starting a procedure of a respective specified mode based on a mode-setting-instruction of said procedure as well as monitoring the transition time by said timer means, and executing a further specified mode when a predetermined time has elapsed in said timer means.

16. A modulator and demodulator (MODEM) for use with a data terminal equipment and a signal line comprising:
(a) memory means for storing an object program containing a plurality of control procedures,
(b) analysis means for deframing a received data-frame and analyzing the deframed data-frame,
(c) switching means for switching an operational mode from a main-channel-mode to a control-channel-mode when said analysis means indicates that the received data-frame is an RCP (return to control for partial page) frame, and
(d) control means for executing a respective one of said plurality of control procedures corresponding to a current one of a plurality of operational modes.

17. A data communication system including a data terminal equipment, and a modulator and demodulator (MODEM) connected to said data terminal equipment, said MODEM comprising:
(a) memory means for storing an object program containing a plurality of control procedures,
(b) analysis means for deframing a received data-frame and analyzing the deframed data-frame,
(c) switching means for switching an operational mode from a main-channel-mode to a control-channel-mode when said analysis means indicates that the received data-frame is an RCP (return to control for partial page) frame, and
(d) control means for executing the control procedure corresponding to the mode just switched.

18. A method for controlling a modulator and demodulator (MODEM) storing an object program containing a plurality of control procedures in a memory means comprising the steps of:
(a) deframing a received data-frame from a signal line,
(b) analyzing the deframed data-frame,
(c) switching an operational mode from a main-channel-mode to a control-channel-mode when said analyzing step detects that the received data-frame is an RCP (return to control for partial page) frame, and
(d) executing the control procedure corresponding to the operation mode just switched.

19. A modulator and demodulator (MODEM) for use with a data terminal equipment and a signal line comprising:
(a) memory means for storing an object program containing a plurality of control procedures,
(b) analysis means for analyzing a received signal,
(c) switching means for switching an operational mode from a control-channel-mode to a main-channel-mode when said analysis means detects a control-channel-ending-signal comprising a special pattern never occurred during data transmitting, and
(d) control means for executing a respective one of said plurality of control procedures to a current one of a plurality of operational modes.

20. A data communication system including a data terminal equipment, and a modulator and demodulator (MODEM) connected to said data terminal equipment, said MODEM comprising:
(a) memory means for storing an object program containing a plurality of control procedures,
(b) analysis means for analyzing a received signal,
(c) switching means for switching an operational mode from a control-channel-mode to a main-channel-mode when said analysis means detects a control-channel-ending-signal comprising a special pattern never occurred during data transmitting, and
(d) control means for executing the control procedure corresponding to the mode just switched.

21. A method for controlling a modulator and demodulator (MODEM) storing an object program containing a plurality of control procedures in a memory means comprising the steps of:

(a) analyzing the received signal from a signal line, (b) switching an operational mode from control-channel-mode to a main-channel-mode when said analyzing step detects a control-channel-ending-signal comprising a special pattern never occurred during data transmitting, and (c) executing the control procedure corresponding to the operation mode just switched.

22. A modulator and demodulator (MODEM) for use with a data terminal equipment and a signal line comprising:

(a) memory means for storing an object program containing a plurality of control procedures, (b) switching means for switching between a plurality of operational modes responsive to said object program, (c) control means for executing a respective one of said plurality of control procedures corresponding to a current one of a plurality of operational modes, (d) transmitting means for transmitting a specified signal to the signal line, (e) timer means for counting a specified time when said transmitting means has started to transmit the specified signal, (f) reset means for resetting said timer means when a response signal to said specified signal is detected from the signal line during the specified time, and (g) notifying means for notifying the data terminal equipment of an abnormality when the specified time expires before said response signal is detected from said signal line.

23. A data communication system including a data terminal equipment, and a modulator and demodulator (MODEM) connected to said data terminal equipment, said MODEM comprising:

(a) memory means for storing an object program containing a plurality of control procedures, (b) switching means for switching between a plurality of operational modes responsive to said object program, (c) executing one of said plurality of control procedures corresponding to one of said plurality of operational modes switched to in step (b), (d) transmitting means for transmitting a specified signal to a signal line, (e) timer means for counting a specified time when said transmitting means has started to transmit the specified signal, (f) reset means for resetting said timer means when a response signal to said specified signal is detected from the signal line during the specified time, and (g) notifying means for notifying the data terminal equipment of an abnormality when the specified time expires before said response signal is detected from said signal line.

24. A method for controlling a modulator and demodulator (MODEM) storing an object program containing a plurality of control procedures in a memory means comprising the steps of:

switching between a plurality of operational modes responsive to said object program, executing one of said plurality of control procedures corresponding to one of said plurality of operational modes switched to, transmitting a specified signal to a signal line, counting a specified time with a timer means, resetting said timer means when a response signal to said specified signal is detected from the signal line during the specified time, and notifying a data terminal equipment of an abnormality when the specified time expires before said response signal is detected from said signal line.

* * * * *